(12) United States Patent
Clark et al.

(10) Patent No.: US 8,718,457 B2
(45) Date of Patent: May 6, 2014

(54) CAMERA CASE

(75) Inventors: Jim Clark, Portland, OR (US); David A. deSousa, Vancouver, WA (US)

(73) Assignee: Unruly, LLC, Portland, OR (US)

( * ) Notice: Subject to any disclaimer, the term of this patent is extended or adjusted under 35 U.S.C. 154(b) by 0 days.

(21) Appl. No.: 13/480,306

(22) Filed: May 24, 2012

(65) Prior Publication Data

US 2013/0315577 A1 Nov. 28, 2013

(51) Int. Cl.
*G03B 17/56* (2006.01)

(52) U.S. Cl.
CPC ............ *G03B 17/561* (2013.01); *G03B 17/568* (2013.01)
USPC .......................................................... 396/27

(58) Field of Classification Search
USPC .................. 396/27, 419, 427, 428; 206/316.2
See application file for complete search history.

(56) References Cited

U.S. PATENT DOCUMENTS

| | | | |
|---|---|---|---|
| 2,944,474 A * | 7/1960 | Dennis | 396/27 |
| 3,821,759 A * | 6/1974 | Vooght | 396/27 |
| 3,860,937 A * | 1/1975 | Wolfe | 396/27 |
| 4,071,066 A | 1/1978 | Schaeffer | |
| D306,305 S | 2/1990 | Robinson et al. | |
| D342,524 S | 12/1993 | Younger | |
| D342,526 S | 12/1993 | Chandler | |
| D367,283 S | 2/1996 | Lyon et al. | |
| D383,769 S | 9/1997 | Ogles | |
| D419,296 S | 1/2000 | Shinano | |
| D460,474 S | 7/2002 | Gotham et al. | |
| 6,449,431 B1 * | 9/2002 | Cuddeback et al. | 396/27 |
| D470,520 S | 2/2003 | Yamakawa et al. | |
| 6,735,387 B1 * | 5/2004 | Schnell | 396/263 |
| 6,955,484 B2 | 10/2005 | Woodman | |
| D537,858 S | 3/2007 | Griffin et al. | |
| 7,273,321 B2 | 9/2007 | Woodman | |
| 7,295,388 B2 | 11/2007 | Shyu et al. | |
| 7,458,736 B2 | 12/2008 | Woodman | |

(Continued)

OTHER PUBLICATIONS

Life Is Unruly. Headcase Pro. lifeisunruly.com Apr. 20, 2012 [online], [retrieved on Nov. 15, 2012]. Retrieved from the Internet <URL: http://www.lifeisunruly.com/headcase-pro/index.html>.

(Continued)

*Primary Examiner* — W B Perkey
(74) *Attorney, Agent, or Firm* — Klarquist Sparkman, LLP

(57) ABSTRACT

Disclosed camera cases are configured to be positioned around a camera such that the camera is retained within the case while remaining operable. The case can have a generally cuboid shape with front, rear, top, bottom, left and right sides. At least two of these sides can comprise at least one mounting feature, such as a threaded hole. The rear side can comprise a door configured to allow a camera to be inserted into the case. The rear door can comprise an adjustable portion that can be coupled to the rear door in at least two different positions, such that the case is adjustable to be used with cameras of different sizes. A trigger button on a side of the case can be configured to activate a camera button positioned on a top side of a camera within the case. The case can be dirt and moisture resistant.

18 Claims, 24 Drawing Sheets

(56) References Cited

U.S. PATENT DOCUMENTS

| | | | |
|---|---|---|---|
| 7,613,386 B2* | 11/2009 | Shimamura | 396/27 |
| D643,313 S | 8/2011 | Bulsink | |
| D644,679 S | 9/2011 | Woodman | |
| 8,014,597 B1 | 9/2011 | Newman | |
| 8,014,656 B2 | 9/2011 | Woodman | |
| D646,313 S | 10/2011 | Woodman | |
| D647,554 S | 10/2011 | Yim | |
| 8,079,501 B2 | 12/2011 | Woodman | |
| D657,808 S | 4/2012 | Woodman | |
| 2009/0032420 A1* | 2/2009 | Zenzai | 206/316.2 |
| 2011/0211820 A1* | 9/2011 | Yim | 396/27 |
| 2011/0286514 A1 | 11/2011 | Newman | |
| 2013/0094846 A1* | 4/2013 | Apter | 396/419 |

OTHER PUBLICATIONS

"GoPro—Wikipedia, the Free Encyclopedia," downloaded from http://en.wikipedia.org/wiki/GoPro, 5pp. (document not dated, downloaded on Feb. 1, 2012).

"Replacement HD Housing—GoPro Official Store: Wearable Digital Cameras for Sports," downloaded from http://gopro.com/camera-accessories/replacement-hd-housing/, 1pp. (document not dated, downloaded on Feb. 20, 2012).

"HD Skeleton Housing—GoPro Official Store: Wearable Digital Cameras for Sports," downloaded from http://gopro.com/camera-accessories/hd-skeleton-housing/, 2pp. (document not dated, downloaded on Feb. 20, 2012).

Non-Final Office action, U.S. Appl. No. 29/419,292, filed Apr. 26, 2012, 10pp. (Dec. 6, 2012).

* cited by examiner

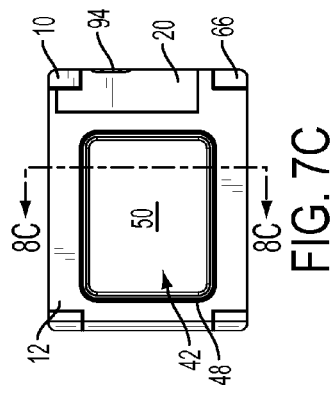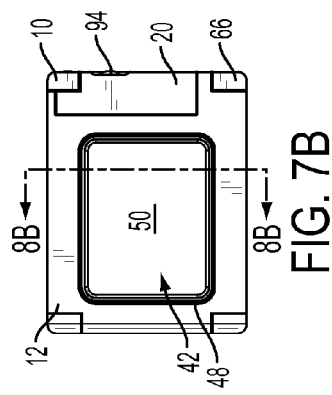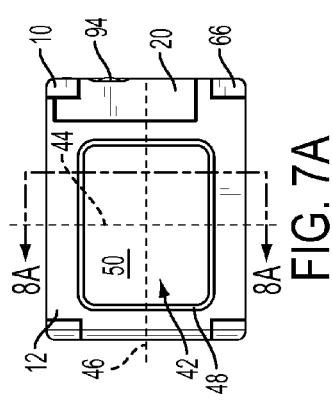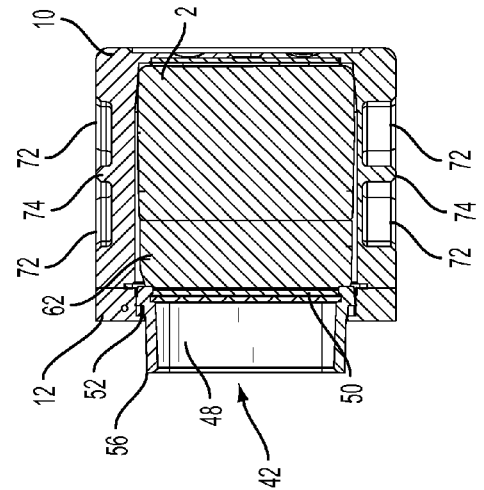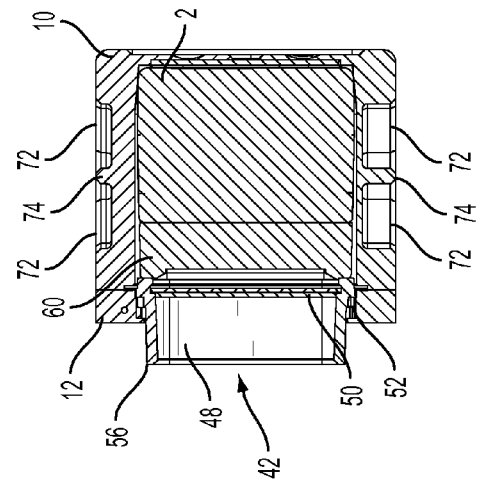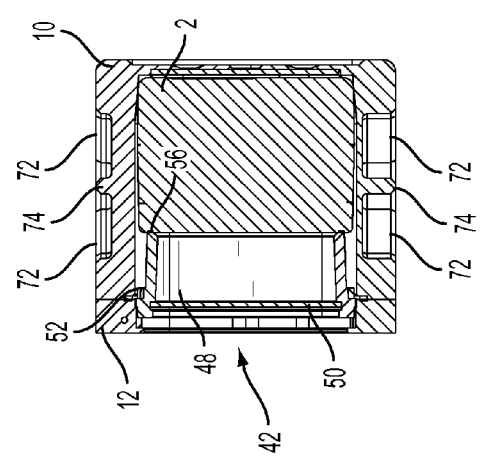

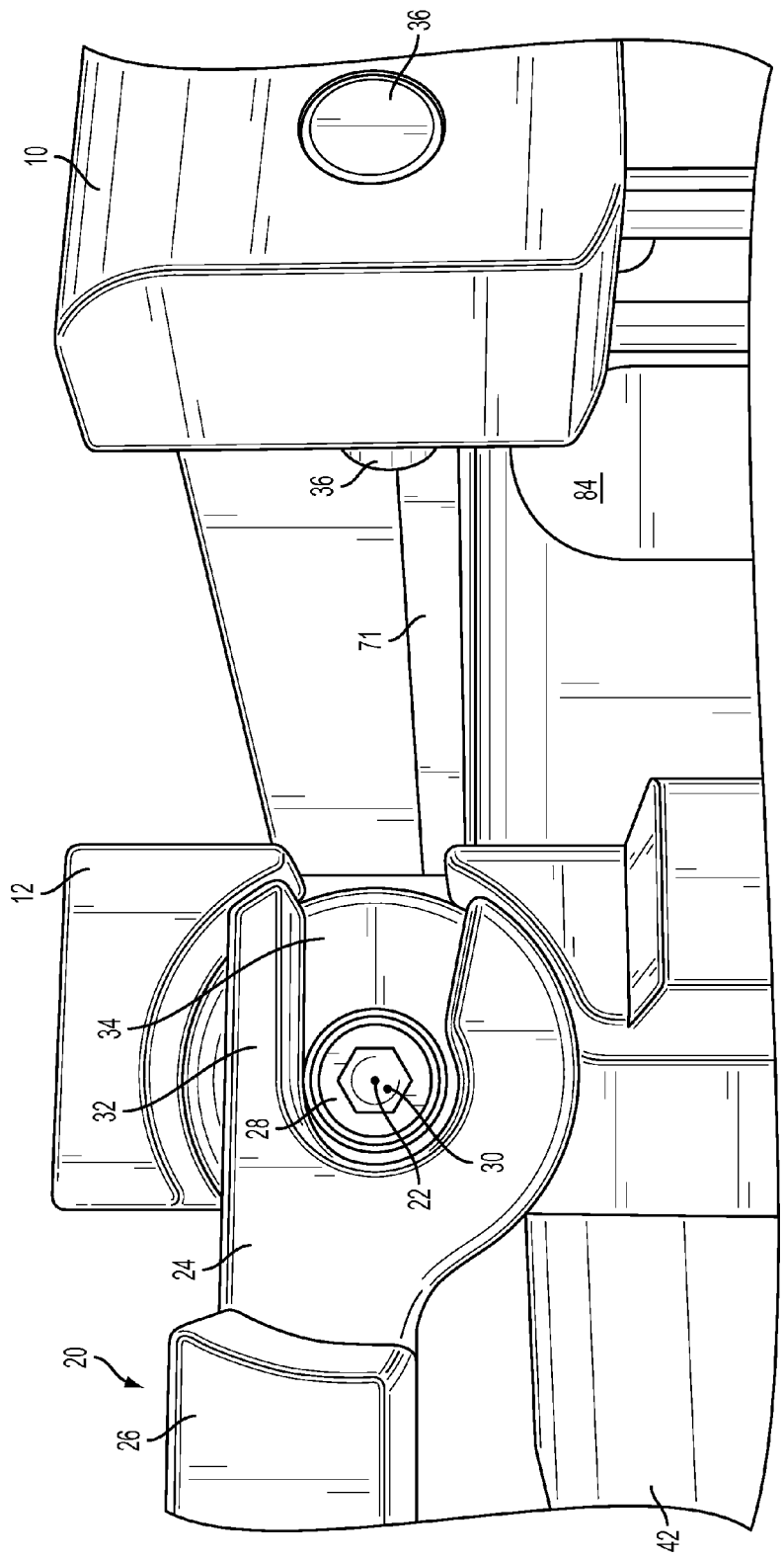

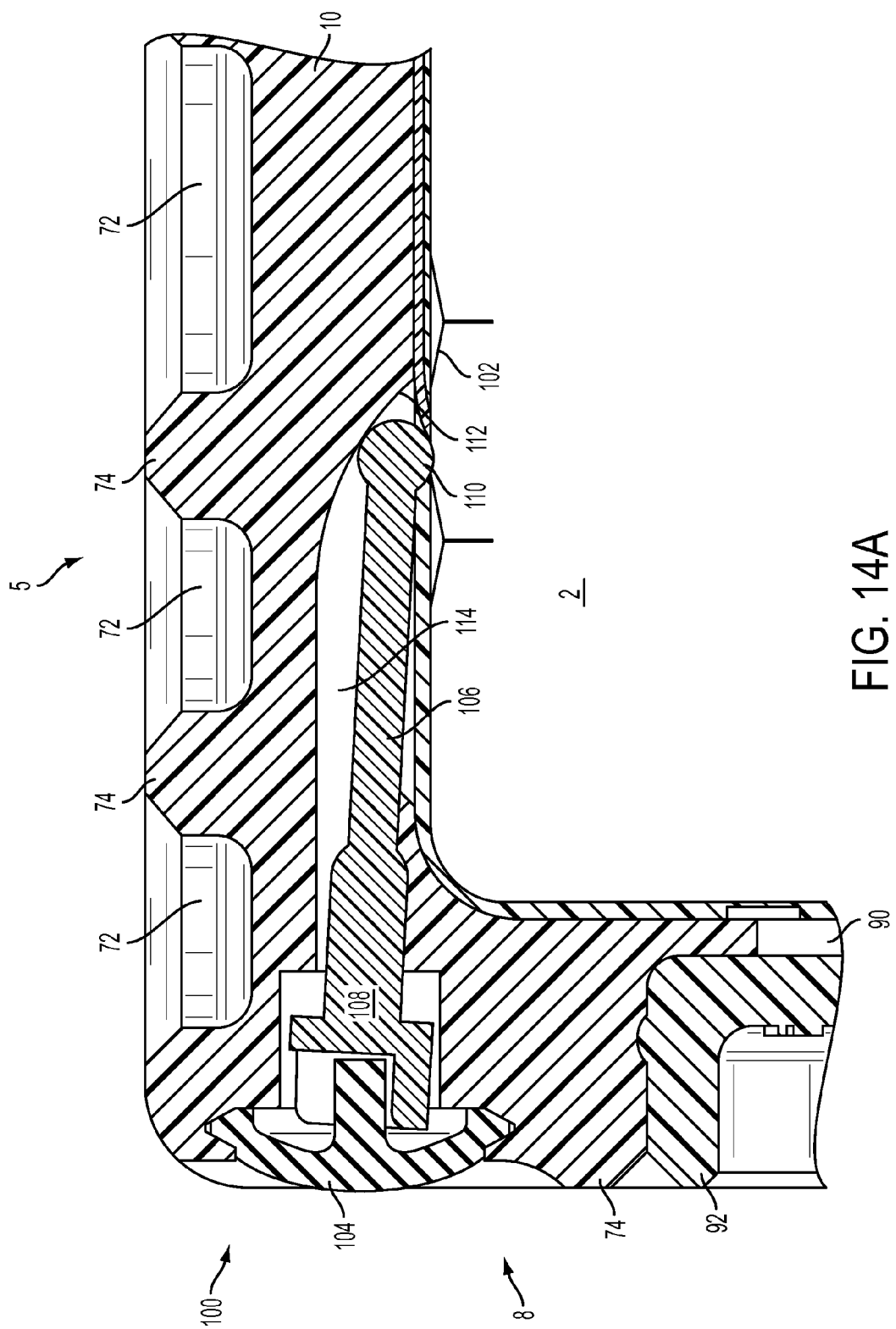

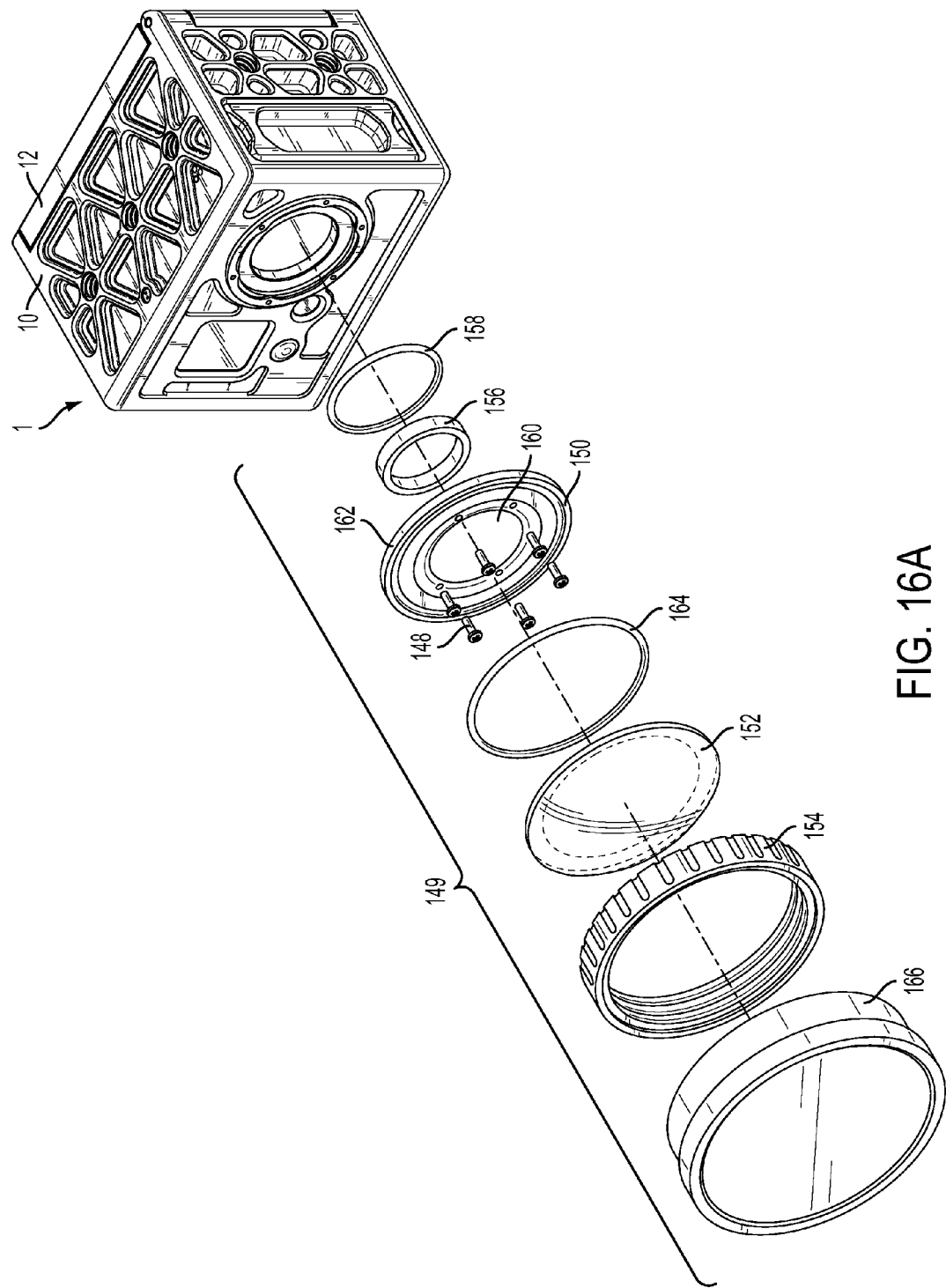

CAMERA CASE

FIELD

This disclosure is related to cases for cameras.

BACKGROUND

Some camera cases are designed to protect a camera while the camera is being used. For example, some camera cases form a waterproof enclosure around a camera so a user can operate the camera underwater. Some camera cases also provide a means for mounting the camera case to another object so that the camera can be supported and/or be operated without the user. For example, some camera cases include a mounting adapter for mounting the case to a stationary stand.

Prior camera cases typically leave much to be desired in terms of durability, ability to protect the camera, use with a wide range of accessories and camera sizes, and mounting options.

SUMMARY

Disclosed camera cases can comprise one or more of several features described herein that significantly improve the functionality of the camera case. These features can comprise, for example, a plurality of different mounting features on different sides of the camera case, an adjustable rear door that allows the case to be used with different sized cameras or a camera in different configurations, locking mechanisms to keep the camera secured within the case, a strong yet light-weight body design, plural different lens cover options, a realigned camera activation trigger, and other features.

Exemplary camera cases disclosed herein can be configured to be positioned at least partially around a camera such that the camera is retained within the case. The case can have a front side, a rear side, a top side, a bottom side, a left side, and a right side. At least two of the front, rear, top, bottom, left, and right sides comprise at least one mounting feature configured to secure the case to a camera mount or other objects. In some embodiments, at least two of the sides each comprise plural mounting features. The mounting features can comprise threaded openings.

The rear side of the case can comprise a rear door configured to allow a camera to be inserted into and removed from the case. The rear door can comprise an adjustable portion that can be coupled to the door in at least two different positions. A frontward facing surface of the adjustable portion can be a different distance from the front side of the case in each of the different positions, such that the case is adjustable to be used with cameras of different depths.

The rear door can comprise a latch for securing the door in a closed position. The latch can be pivotable relative to the rear door about a pivot axis and can comprise an engagement portion, or claw, having a central axis that is parallel with and offset from the pivot axis. The claw can be engagable with a pin in the rear side of the case, such that rotation of the latch about the pivot axis with the pin positioned in the claw of the latch causes a cam effect that secures the rear door to the rear side of the case.

The rear door latch can also include at least one magnet coupled to the latch and/or at least one magnet coupled to the rear side of the case, such that the magnets engage each other or a portion of the case when the latch is in a locked position against the rear door.

The rear door can comprise a first opening, such as a horizontal threaded screw hole. A rearwardly projecting foot of the body of the case can have a second opening, or passageway, that aligns with the first opening when the rear door is in a closed position. The case can further comprise a fastener that is positionable in a passive position wherein the fastener is inserted into the first opening only and positionable in a locked position wherein the fastener extends through the second opening and into the first opening, such that the door is locked in the closed position.

The case can comprise a trigger on the right side or left side of the case that is configured to activate a camera button positioned on a top side of a camera within the case. The trigger can comprise a button head and a generally horizontal rod having a first end and a second end, with the first end of the rod coupled to the button head and the second end positioned adjacent the camera button. Depressing the button head causes the second end of the rod to slide along an inclined surface of the case that deflects the second end of the rod downward toward the camera button to activate the camera.

In some embodiments of the case, at least one of the top and bottom sides comprises a vertically aligned passageway filled at least partially with a light-transmissive solid material. The passageway can be positioned to align with a light emitting feature of a camera within the case such that light from the light emitting feature is visible through the passageway.

Several sides of the case can comprise strategically positioned recessed portions to reduce the weight of the camera while maintaining strength.

In some embodiments of the case, each of the top, bottom, right and left sides includes plural threaded openings for mounting one or more camera accessories, and each side includes one or more cut out portions. In some embodiments, the cut out portions collectively encompass at least fifty percent of the surface area of the respective side of the body.

BRIEF DESCRIPTION OF THE DRAWINGS

FIGS. 7A-7C are rear elevation views of the case of FIG. 1, showing an adjustable rear door portion in three different configurations.
FIGS. 8A-8C are cross-sectional side views of the case of FIG. 1 in each of the configurations of FIGS. 7A-7C, taken along section lines A-A, B-B, and C-C, respectively.
FIG. 13A shows the latch of FIG. 12 in the unlocked position with the door ajar.

FIGS. 14A and 14B are cross-sectional views of a trigger mechanism of the case of FIG. 1, taken along section line 14A-14A of FIG. 3.

FIG. 16A is an exploded perspective view of a second lens cover for the case of FIG. 1.

DETAILED DESCRIPTION

Figure 1:
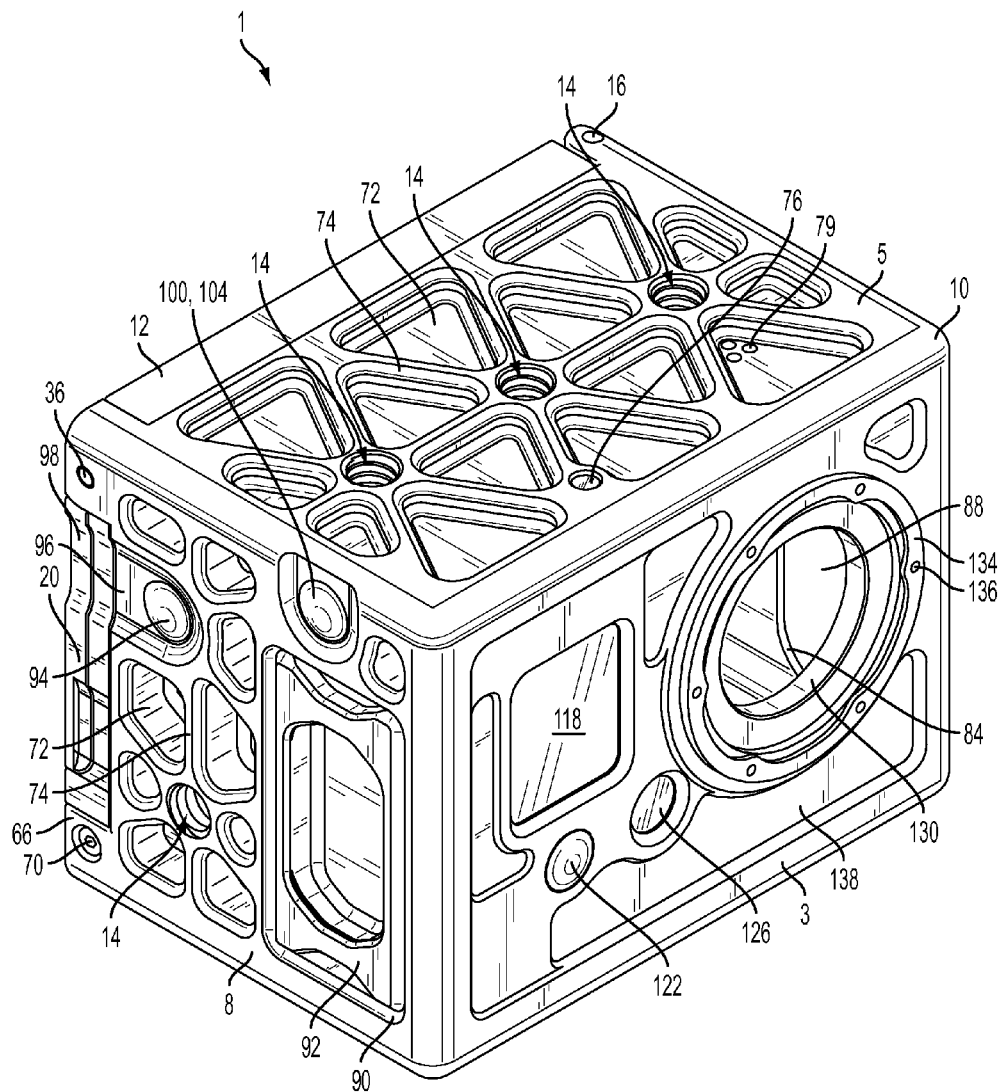
FIG. 1 is a perspective view of an exemplary camera case.
Figure 2:
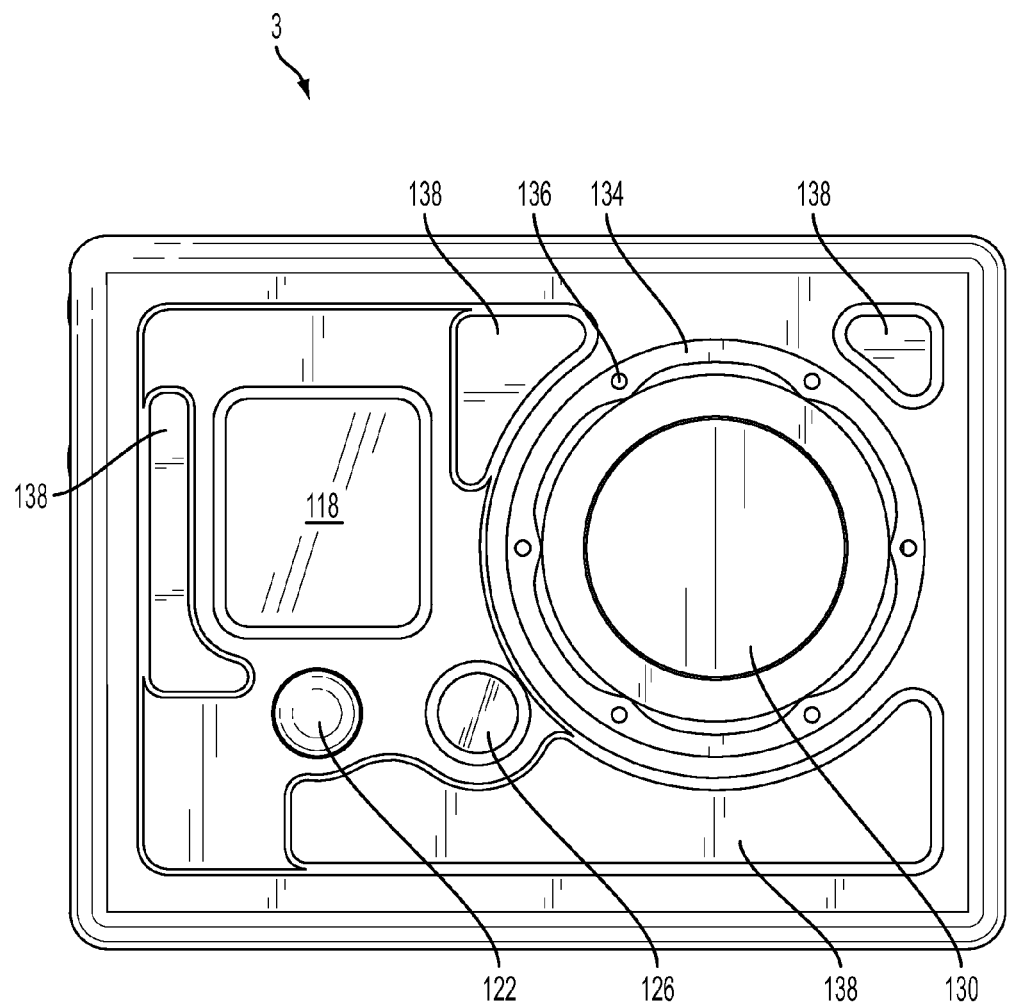
FIG. 2 is a front elevation view the case of FIG. 1.

Described herein are embodiments of a camera case 1. The case 1 can be positioned at least partially around a camera (such as the camera 2 in FIGS. 11A-11C) such that the camera is retained within the case. As used herein, the term "camera" means any device for taking photographs, recording video, or otherwise creating a record of images or light received by the camera. The case 1 can serve several purposes. The case 1 can protect the camera, such as from impacts, moisture, dirt, etc. The case 1 also can be coupled to various objects in different orientations to position the camera as desired. For example, the case 1 can be coupled to one or more mounting accessories, to a vehicle, to a helmet, or other objects.

As shown in FIGS. 1-7C, the case 1 can be generally cuboid and can have a front side 3, a rear side 4, a top side 5, a bottom side 6, a left side 7 (the left side when viewed from the rear), and a right side 8 (the right side when viewed from the rear). The front side 3 of the case corresponds to the side of the camera having a lens or other feature that receives images. The rear side 4 is the opposite side from the front side 3. The case 1 comprises a body 10 having an internal opening for receiving a camera and a lockable rear door 12 that allows a camera to be inserted into the body and removed from the body. The case 1 further comprises various other features that allow a user to interact with a camera through the surrounding case. These features can comprise windows, openings, buttons, and/or other features.

At least two of the front, rear, top, bottom, left and right sides of the case 1 can comprise at least one mounting feature configured to secure the case to another object, such as a camera mount, a mounting accessory, etc. In some embodiments, at least three sides of the case 1 comprise at least one mounting feature configured to secure the case to another object. In some embodiments, at least four sides of the case 1 comprise at least one mounting feature configured to secure the case to another object. In some embodiments, at least two sides of the case 1 comprise at least two mounting features configured to secure the case to another object. In some embodiments, at least three sides of the case 1 comprise at least two mounting features configured to secure the case to another object. In some embodiments, at least two sides of the case 1 comprise at least three mounting features configured to secure the case to another object. In some embodiments, the top side 5 comprises three mounting features, the bottom side 6 comprises three mounting features, the left side 7 comprises two mounting features, and/or the right side 8 comprises one mounting feature. Some embodiments can have nine or more different mounting features.

Each of the mounting features of the case 1 can independently mount the case to another object. Two or more of the mounting features can also be used to mount the case 1 to one object. One or more mounting features can comprise threaded openings (such as the threaded openings 14 shown throughout the Figures), such as quarter-twenty threaded holes, that can be attached to externally threaded objects. One or more of the mounting features can also comprise various other attachment mechanisms, such as friction-based attachments or mechanical locking mechanisms. Using the various mounting features, the case 1 can be coupled to one or more different mounting objects and can be used to position a camera in a wide variety of different orientations.

The rear door 12 of the case 1 is mounted to the rear side of the body 10 via one or more hinges 16 and pivotable between an open position and a closed position to allow a camera to be inserted into the case, secured within the case, and removed from the case. The rear door 12 can be hinged about a vertical axis on one side of the case 1, such as the left side 7 of the case (as shown), such that the door 12 pivots horizontally relative to the body 10. In other embodiments (not shown), the rear door can be hinged about a horizontal axis on the top or bottom of the case, such that the door pivots vertically relative to the body.

Figure 12:
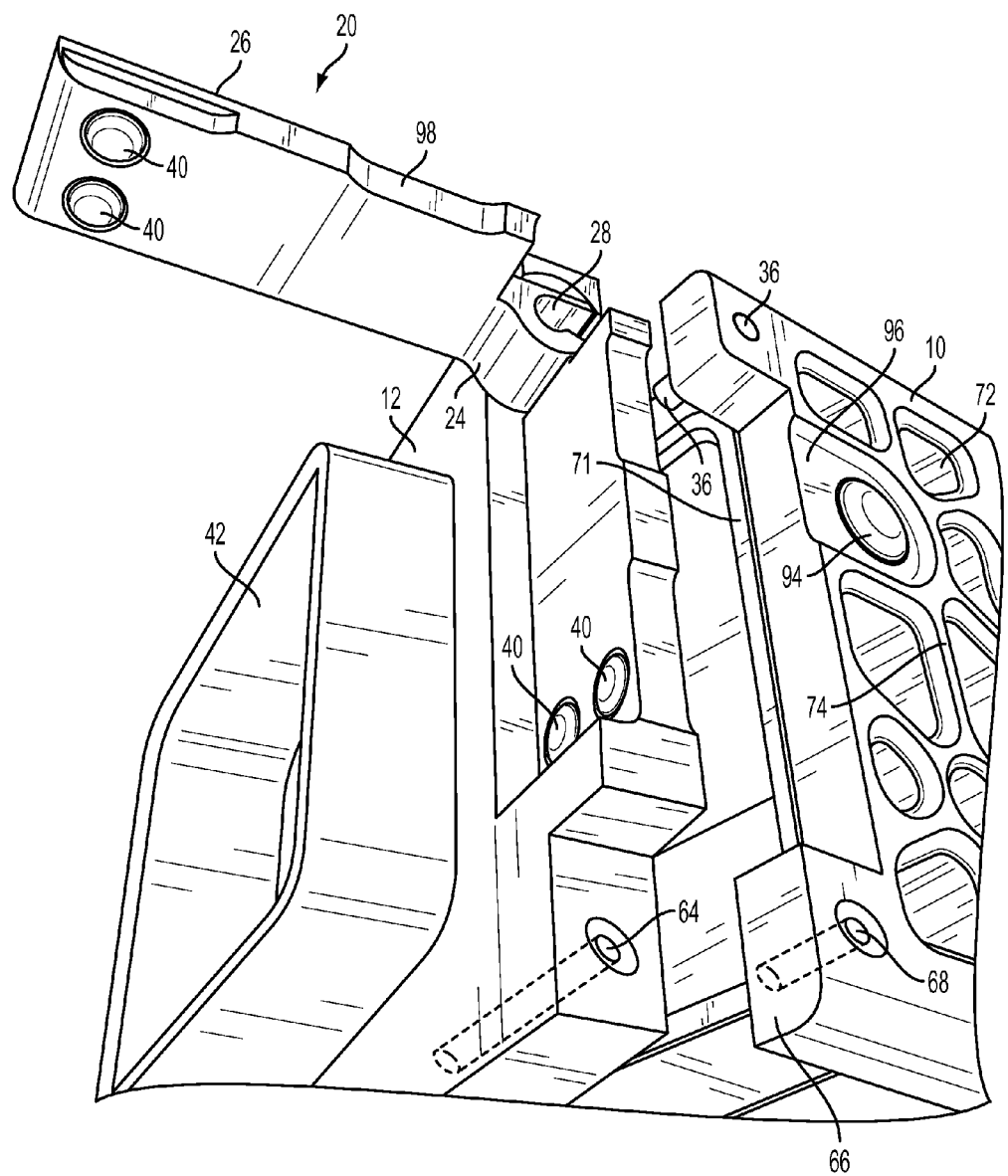
FIG. 12 is a perspective view of the rear-right-bottom side of the case of FIG. 1 with the rear door partially ajar and a latch in an unlocked position.

The rear door 12 can comprise a latch 20 for securing the door in the closed position. The latch 20 can be can be coupled to the rear door 12 via a hinge defining a latch pivot axis 22 (see FIG. 13A) and pivotable relative to the rear door about the latch pivot axis between a secured position and an unsecured position. The secured position is shown in FIGS. 7-9, and the unsecured position is shown in FIG. 12. The latch pivot axis 22 can be oriented horizontally left-to-right adjacent the top of the rear door 12, for example. The latch 20 can comprise an engagement portion or claw 24 at the base of the latch and a handle portion 26 extending from the claw. The handle 26 projects rearwardly in the unsecured position, and the handle projects downwardly in the secured position.

Figure 13B:
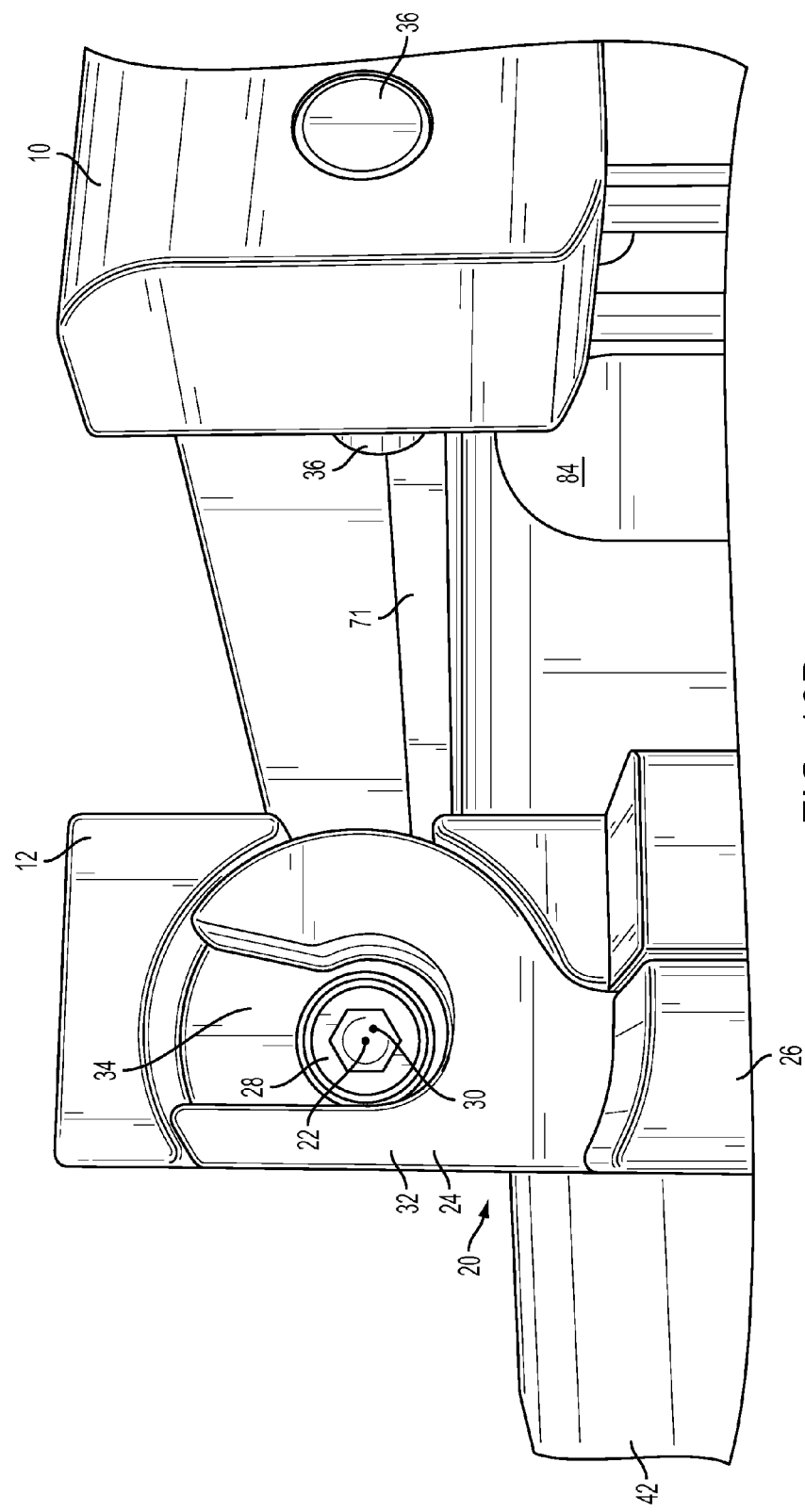
FIG. 13B shows the latch of FIG. 12 in a locked position with the door ajar.

As shown in FIG. 13A, the claw 24 can comprise a generally cylindrical central recess 28 having a central axis 30 that is parallel with and offset slightly from the latch pivot axis 22. The claw 24 can comprise a sidewall 32 around the recess 28 that has an open section 34 that faces opposite of the handle 26, such as toward the front side 3 of the case when the latch handle is extending rearwardly away from the door 12 in the unsecured position. In the unsecured position, the central axis 30 of the claw recess can be slightly below and behind the latch pivot axis 22, as shown in FIG. 13A. When the latch 20 is in the secured position with the handle 26 extending downwardly and the open section 34 of the claw facing upwardly (FIG. 13B), the central axis 30 of the claw can be positioned slightly below and in front of the latch pivot axis 22.

When the door 12 is pivoted toward the closed position with the latch 20 in the unsecured position (FIG. 12), the claw 24 can engage a pin 36 in the top rear side of the body 10. The pin 36 can be generally cylindrical and oriented such that its longitudinal axis is aligned with the central axis 30 of the claw (when the door 12 is closed and the latch 20 is in the secured position, as shown in FIGS. 7-9) and is slightly offset below and in front of the latch pivot axis 22. With the latch handle 26 extending horizontally rearwardly from the rear door 12 (unsecured position), the claw 24 can be moved over the pin 36 with the pin entering the recess 28 in the claw through the open section 34 in the sidewall of the claw. With the pin 36 positioned within the claw 24, pivoting of the latch 20 about the latch pivot axis 22 toward the secured position can cause a cam effect that grips the pin securely within the claw and tightens the rear door 12 against the rear of the body 10 of the case and secures the rear door 12 in the closed position. The latch 20 can naturally urge itself toward the secured position due to the cam effect caused by the claw central axis 30 being slightly offset from the latch pivot axis 22. A gasket 71 can be positioned between the rear door 12 and the rear of the body 10 around the perimeter of the internal opening the case to prevent moisture and dirt from entering the case.

The latch handle 26 can be positioned vertically against the rear of the door 12 when the door is in the closed position with the latch 20 secured to the pin 36. The cam effect of the claw 24 and the pin 36 can help retain the latch 20 in the vertical position, requiring a significant force on the handle 26 to pivot the latch back to the rearwardly projecting horizontal position in order to open the rear door 12.

As shown in FIG. 12, to help retain the latch 20 in the secured position, one or more magnets 40 can be disposed on the latch handle 26 and/or on the rear of the door 12 where the latch handle abuts the door when in the secured position. In some embodiments, one or more magnets 40 can be disposed on both the latch handle 26 and on the rear of the door 12, the magnets being attracted to one another and engagable with one another to secure the latch handle against the door.

The rear door 12 of the case can comprise an adjustable portion that can be coupled to the rear door in at least two different positions. In some embodiments, such as the embodiments shown, the adjustable portion 42 can be coupled to the rear door 12 in at least three different positions. In each of the different positions, the adjustable portion 42 can project into the body 10 a different distance such that the case 1 is adjustable to be used with cameras having different front-to-rear dimensions, or depths. In some embodiments, the adjustable portion 42 can be coupled to the rear door 12 in at least three different positions that correspond to cameras or camera/accessory combinations having three different depths. In each of the different positions, the adjustable portion 42 can contact a rear surface of the camera to hold the camera snuggly within case 1, urging a front surface of the camera against an inner surface of the front side 3 of the case.

The adjustable portion 42 can be coupled to the door 12 in a first position (FIGS. 7A, 8A, 9A, 10A) and second position (FIGS. 7C, 8C, 9C, 10C) wherein the adjustable portion is rotated 180° about a first axis, such as about a vertical axis 44 (FIG. 7A), relative to the first position. The adjustable portion 42 can further be coupled to the door 12 in a third position (FIGS. 7B, 8B, 9B, 10B) wherein the adjustable portion is rotated 180° about a second axis, such as about a horizontal axis 46 (FIG. 7A) relative to the second position. The first axis can be perpendicular to the second axis. The adjustable portion 42 can comprise keying features, such as cutouts 52 (FIG. 10A) that mate with corresponding keying features in the rear door 12, such as tabs 54 (FIG. 10D), such that the adjustable portion 42 can be held securely by the rear door 12 in each of the different positions.

The adjustable portion 42 can be generally rectangular and can comprise a transparent central window 50 such that the rear of the camera 2 can be viewed through the rear door 12. The central window 50 can be surrounded by an annular hood 48. The hood 48 can extend in one direction perpendicularly from the plane of the central window 50 and terminate in a projecting edge 56 of the hood. The perimeter of the hood 48 adjacent to the window can comprise the keying features 52 that allow the adjustable portion 42 to mate with corresponding keying features 54 positioned around a central opening in the rear door 12 (FIG. 10D).

When a camera having a relatively shallow depth (e.g., camera 2 in FIG. 11A) is in the case 1, the adjustable portion 42 can be positioned in the first position such that the hood projects into the interior of the case (FIG. 10A) effectively reducing the depth of the case. To configure the adjustable portion 42 in the first position, the adjustable portion can be inserted window 50 first into the central opening of the rear door 12 from the internal side of the rear door. The hood can be blocked by the central opening of the rear door 12 to prevent the adjustable portion 42 from sliding out completely through the central opening in the rear door. In the first position, the adjustable portion 42 is trapped between the rear of the camera 2 and the rear door 12 when the rear door is closed. The projecting edge 56 of the hood can project into the body 10 and contact the rear of the camera 2 to hold the camera snuggly within the case when the rear door 12 is closed. In the first position, the central window 50 can be about even with, or slightly forward of (as in FIG. 8A), the surrounding portions of the rear door 12.

When a camera having a relatively deep depth is in the case 1, the adjustable portion 42 can be positioned in the second or third positions (FIGS. 10B, 10C) such that the hood 48 projects rearwardly out of the rear door 12, effectively increasing the depth of the case 1. To configure the adjustable portion 42 in the second or third positions, the adjustable portion can be inserted from the internal side of the rear door 12 with the projecting edge 56 of the hood being inserted through the opening in the rear door first. The hood 48 can be blocked by the inner perimeter of the rear door 12 opening to prevent the adjustable portion 42 from sliding completely out through the opening in the rear door. In the second and third positions, the keyed portion of the hood 48 is trapped between the rear of the camera and the rear door 12 when the rear door is closed, with the projecting edge 56 of the hood extending rearwardly from the rear door. The keyed portion of the hood can contact the rear of the camera to hold the camera snuggly within the case 1 when the rear door 12 is closed.

The keyed portion of the hood can configured such that the hood extends a different distance rearwardly through the opening in the rear door 12 depending on the rotational orientation of the adjustable portion 42 about a horizontal axis extending in a front-to-rear direction. In the second position (FIG. 10B), the cutouts 52 in the hood 48 are not aligned with the tabs 54 around the central window of the door, so the forward-most surface of the hood 48 is positioned just forwardly of the internal surface of the rear door 12, such that the adjustable portion 42 extends a small amount into the interior of the case 1.

In the third position (FIG. 10C), with the adjustable portion 42 rotated 180° relative to the second position, the cutouts 52 in the hood are aligned with the tabs 54 in the rear door, allowing the tabs 54 to slide into the cutouts 52 and allowing adjustable portion 42 to sit farther rearward in the rear door 12. In the third position, the forward-most surface of the hood 48 is positioned about evenly, or flush, with the surrounding internal surface of the rear door 12. In the third position, the adjustable portion 42 may not project into the case at all.

Figure 10A:
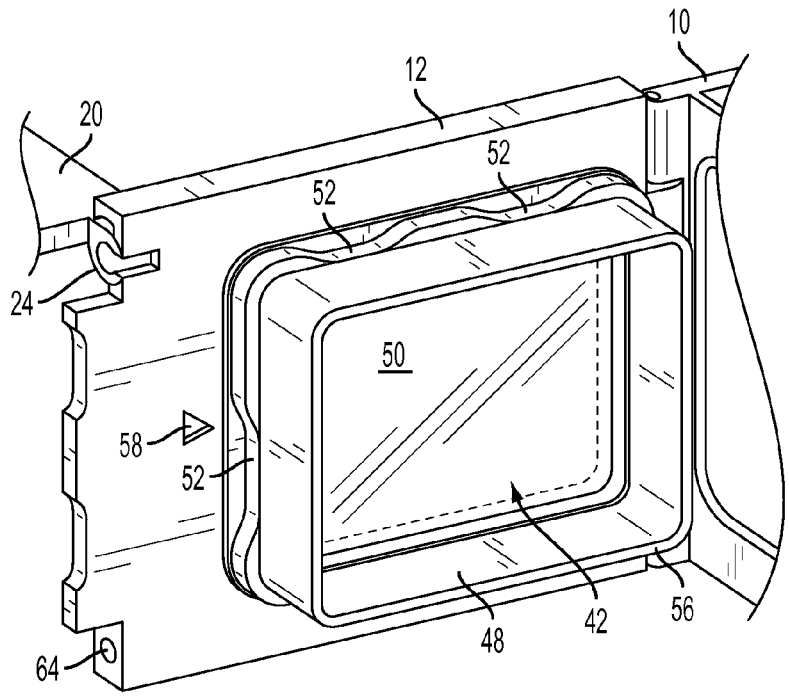
FIGS. 10A-10C are views of the internal side of a rear door of the case of FIG. 1 illustrating the adjustable portion in the three different configurations of FIGS. 7A-7C, respectively.
Figure 10B:
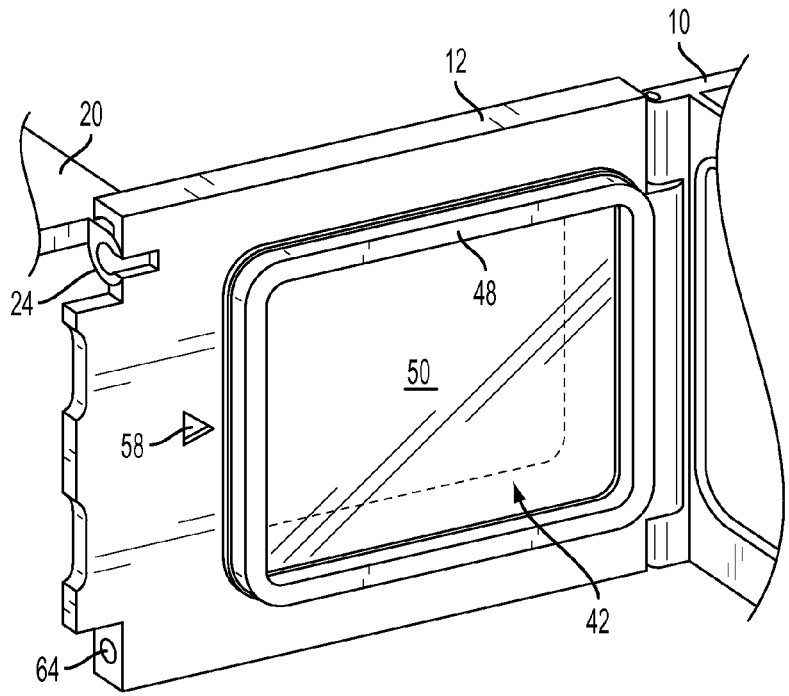
Figure 10C:
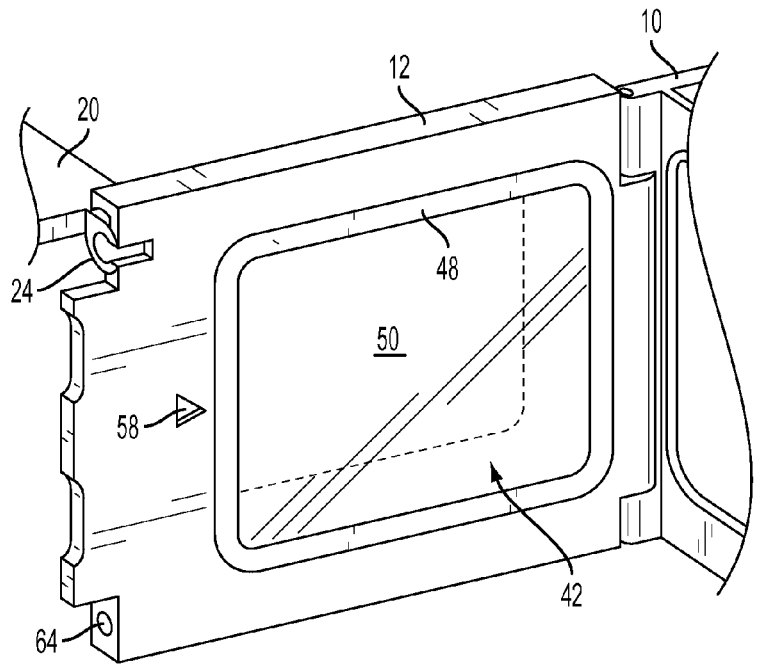
Figure 10D:
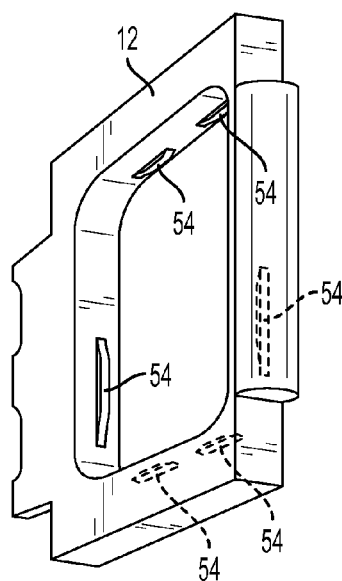
FIG. 10D shows the rear door of FIGS. 1A-10C with the adjustable portion removed.

The rear door 12 can comprise a first indicator, such as the indicator 58 shown in FIGS. 10A-10C, to help a user orient the adjustable portion 42 when selecting between the second and third positions. The perimeter of the hood 48 can comprise a second indicator on one side that indicates the second position and a third indicator on the opposite side that indicates the third position. When the adjustable portion is in the second position, the second indicator aligns with the first indicator 58 on the door, and when the adjustable portion is in the third position (rotated 180° from the second position), the third indicator aligns with the first indicator 58 on the door.

In other embodiments, the adjustable portion of the rear door can be configurable in more than three different positions and/or the positions can be configured to house cameras of any depth, including cameras with accessories and cameras having an uneven rear surface.

Figure 9A:
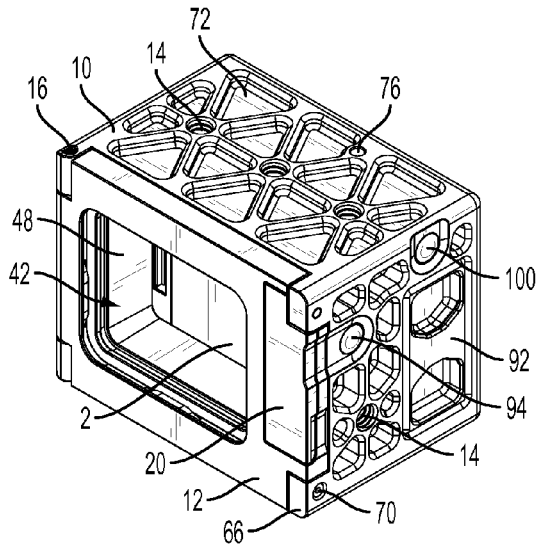
FIGS. 9A-9C are perspective views of the rear-right-top of the case of FIG. 1 corresponding to the three different configurations of the adjustable portion shown in FIGS. 7A-7C, respectively.
Figure 9B:
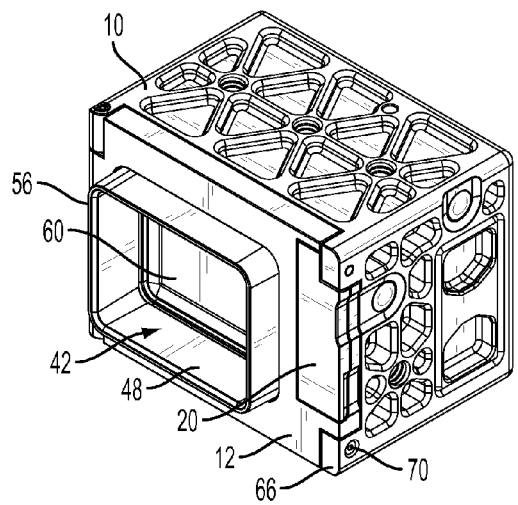
Figure 9C:
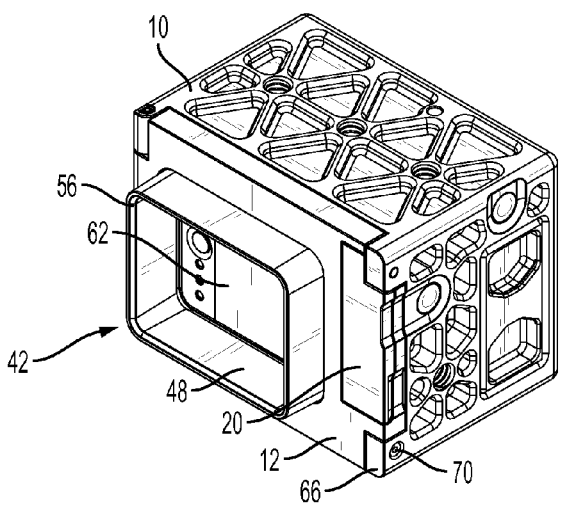
Figure 11A:
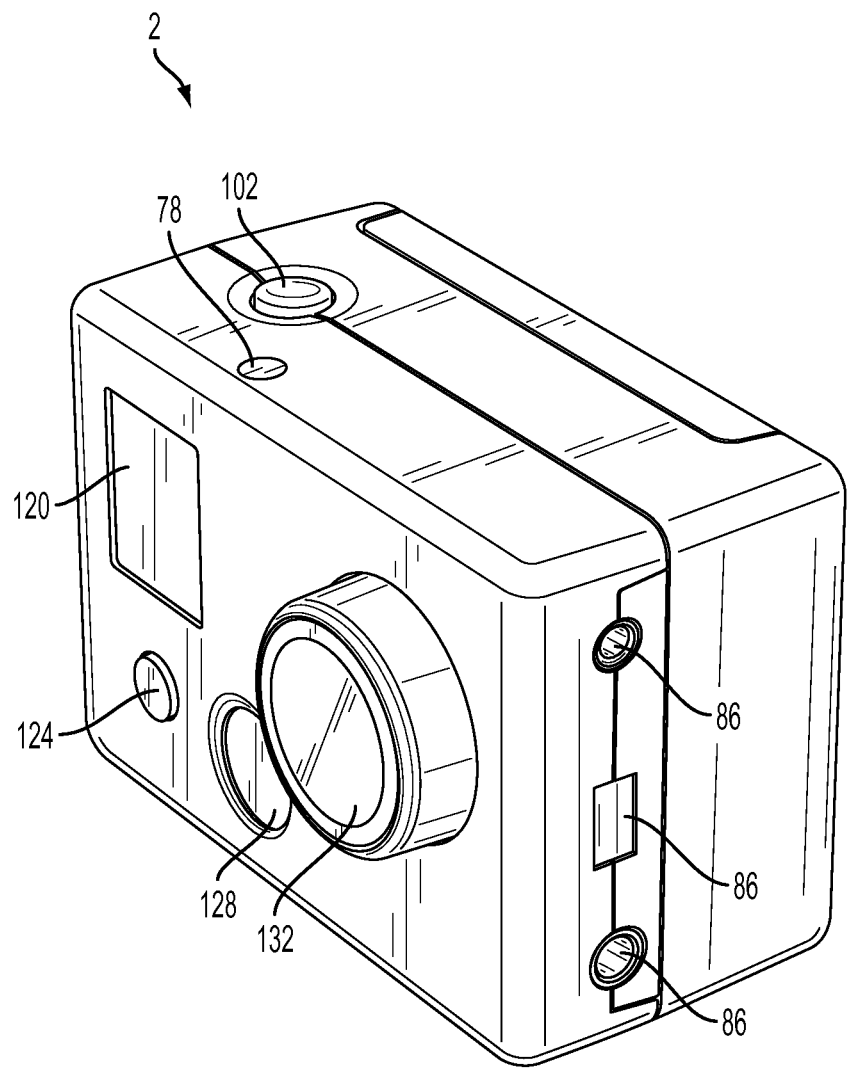
FIG. 11A shows an exemplary camera that can be secured within the case of FIG. 1.
Figure 11B:
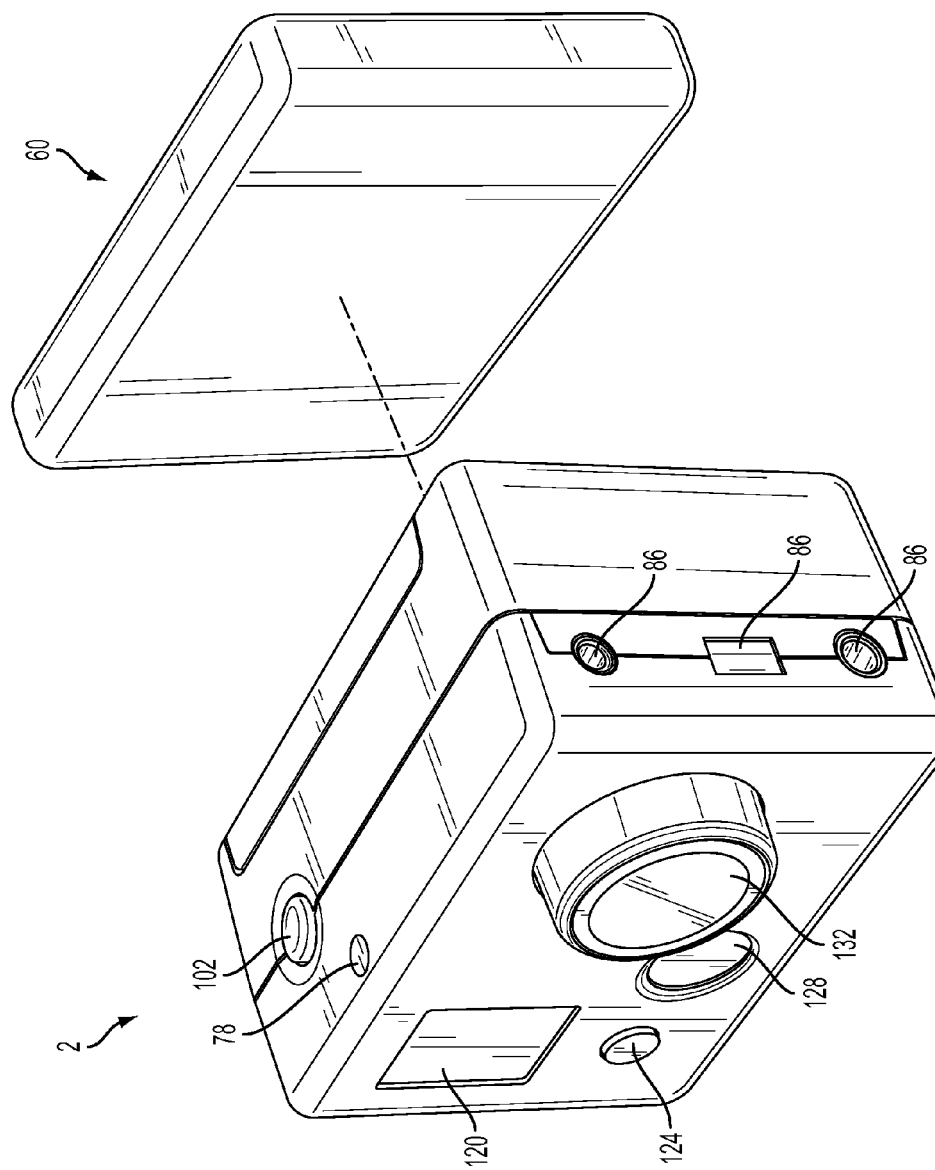
FIGS. 11B and 11C show the camera of FIG. 11A with camera accessories of different depths attached to the rear side of the camera.
Figure 11C:
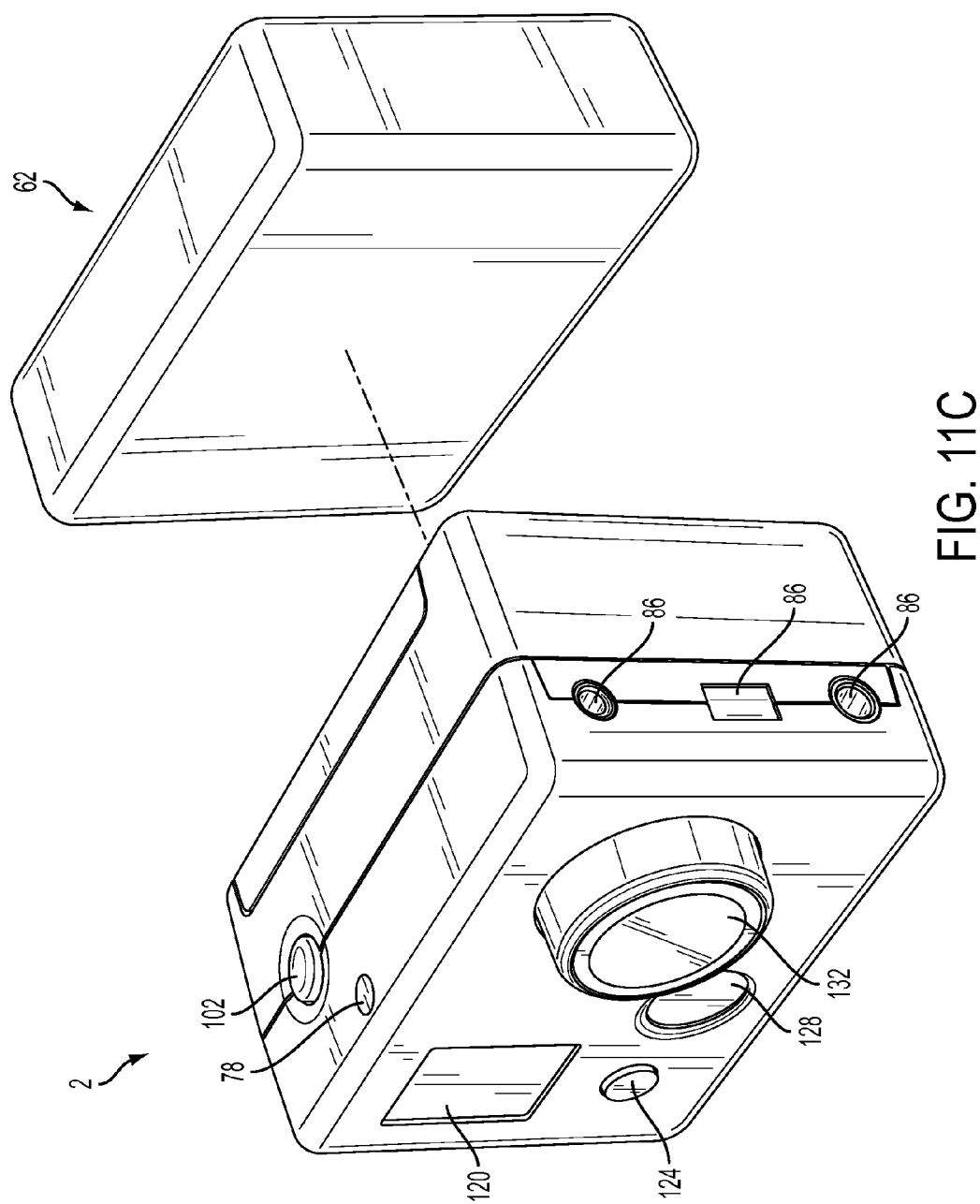

The different positions of the adjustable portion 42 of the rear door 12 can correspond to different depths of a camera when the camera is equipped with different camera accessories. The first position, with the shallowest depth, can correspond to the camera 2 with no accessory attached to the back of the camera, as shown in FIGS. 9A and 11A. The second position can correspond to the camera 2 with a first accessory 62 (e.g., a video monitor) attached to the back of the camera, as shown in FIGS. 9C and 11C, and the third position can correspond to the camera 2 with a second accessory 60 (e.g., a battery pack) attached to the back of the camera, as shown in FIGS. 9B and 11B. The accessories 60, 62 can have different depths themselves, such that the overall depth of the camera 2 and an attached accessory differs depending on which accessory is attached to the back of the camera. The accessories 60, 62 can comprise any of a variety of objects, such as a battery pack and video monitor.

Figure 3:
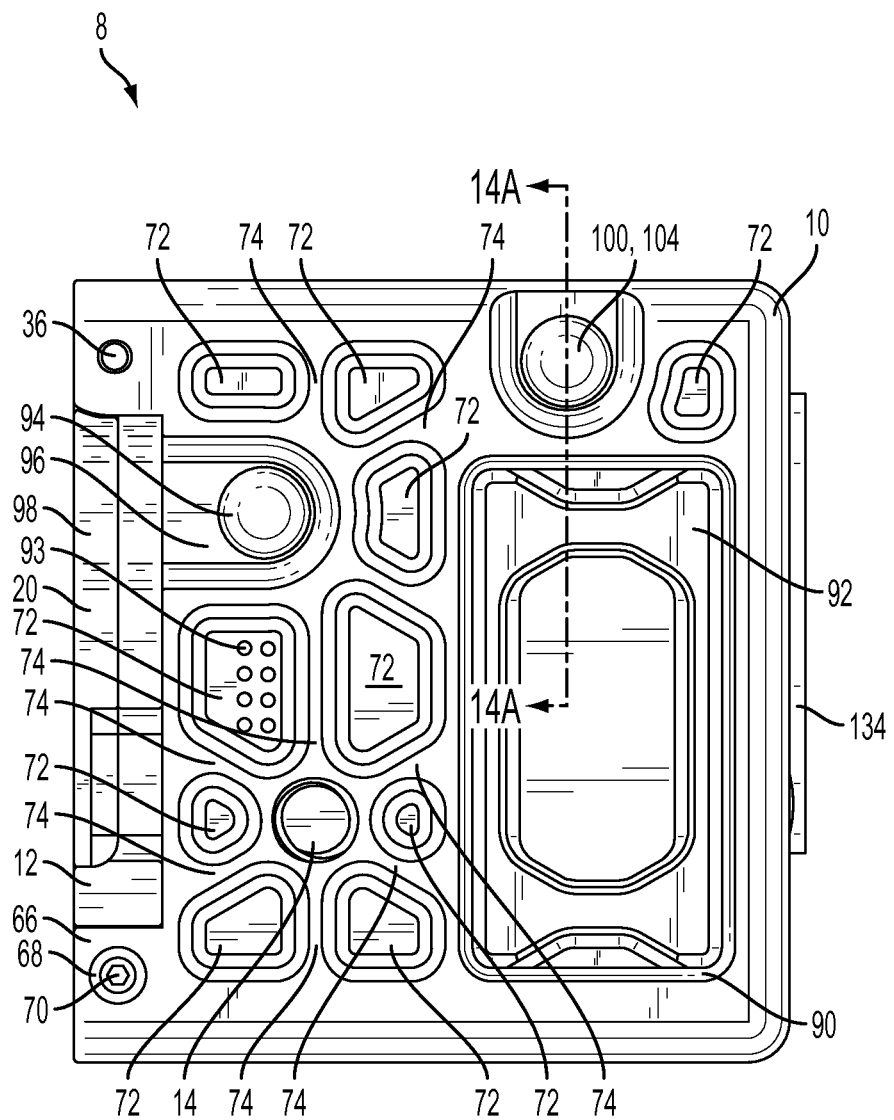
FIG. 3 is a right side elevation view the case of FIG. 1.

In addition to the latch 20 and/or the magnets 40, additional mechanisms can be included to further secure the rear door 12 in the closed position to prevent a camera from accidentally coming out of the case 1. Security of a camera within the case 1 can be particularly important when the camera and case are mounted on a moving object, such as a moving vehicle. As shown in FIG. 12, in some embodiments, the rear door 12 can comprise a first opening 64. The rear side 4 of the case 1 can comprise a rearwardly projecting tab or foot 66 having a second opening 68 that aligns with the first opening 64 when the rear door 12 is in a closed position. A fastener 70, such as a screw or pin, (see FIGS. 1 and 3) can extend through the second opening 68 and at least partially into the first opening 64 to lock the door 12 in the closed position, as shown in FIG. 3. When the fastener 70 is not in use, the fastener can be positioned in a passive position with the fastener inserted fully into the first opening 64 in the rear door 12 only. The first opening 64 can be a horizontally oriented opening, such as a threaded screw hole, adjacent the free end of the rear door 12 and the second opening 68 can be a horizontally oriented passageway extending through the rearwardly projecting foot 66 in the rear side of the body 10. In the locked position, the fastener can be inserted horizontally from the right side of the foot 66 and extend through the second opening 68 and engage with the first opening 64.

As shown in FIGS. 1 and 3-6, the body 10 can comprise a plurality of recesses 72, or cut-out portions. The recesses 72 can serve several purposes, such as helping reduce the weight of the case. Some of the recesses can comprise the threaded openings 14 for mounting the case 1 to other objects. Most of the recesses 72 comprise a solid floor such that the recesses do not connect with the internal opening within the case. The recesses 72 can comprise beveled or rounded edges. The recesses 72 can be separated by ribs 74 and/or other non-recessed portions that provide structural integrity to the case. In some embodiments, the left, right, top and bottom sides of the body 10 comprise recesses 72 and ribs 74, in addition to buttons, camera access ports, and other features.

The top side 5 of the case (FIG. 5) can comprise three threaded openings 14 for mounting the case to other objects. The three threaded openings 14 can be aligned left-to-right, can be equally spaced apart, and can be about half way between the front side 3 and rear side 4 of the case. Each threaded opening 14 can comprise a threaded cylindrical side wall and flat floor. Each threaded opening can have six ribs 74 extending radially from the threaded opening. The six ribs 74 can be arrayed about 60° apart from one another. Some of the ribs 74 can connect the threaded openings 14 with the front, rear, left and right sides of the case, while other ribs 74 can connect two of the threaded openings 14 to one another. Some of the ribs 74 can define generally triangular recesses 72 between the ribs. In some embodiments, the top side 5 of the case can comprise 14 or more recesses 72, such as generally triangular recesses, in addition to the three threaded openings 14. This rib and recess pattern can provide reduced weight and increased strength to the case 1. The top side 5 of the case can also comprise a vertical passageway 76 that is filled with a transparent material and configured to align with a light 78 on the top of the camera 2 within the case such that the light 78 can be viewed through the passageway 76. One or more of the recesses 72 can comprise one or more small holes 79 passing into the internal opening of the case to allow sound from the camera to pass through the case. These holes 79 can be covered by a thin membrane, such as adhesive tape, or other sound transmitting material, to prevent dirt and moisture from entering the case while still allowing sound to pass through the case.

The bottom side 6 of the case (FIG. 6) can comprise a rib and recess pattern that is similar to the top side 5 of the case. The bottom side 6 of the case can also comprise three threaded openings 14 that can be aligned left-to-right, can be equally spaced apart, and can be about half way between the front side 3 and rear side 4 of the case. The bottom side 6 of the case can also comprise a plurality of ribs 74 connecting the threaded openings 14 to the left, right, front and rear sides of the case and a plurality of triangular recesses 72 between the ribs. The recesses 72 in the bottom side 6 of the case can be deeper than the recesses 72 in the top side 5 of the case. The bottom side 6 of the case can also comprise a small transparent window or filled passageway 80 located in the floor of one of the recesses 72 that is configured to align with a light on the bottom of the camera (not shown) such that the light can be viewed through the bottom side 6 of the case.

Figure 4:
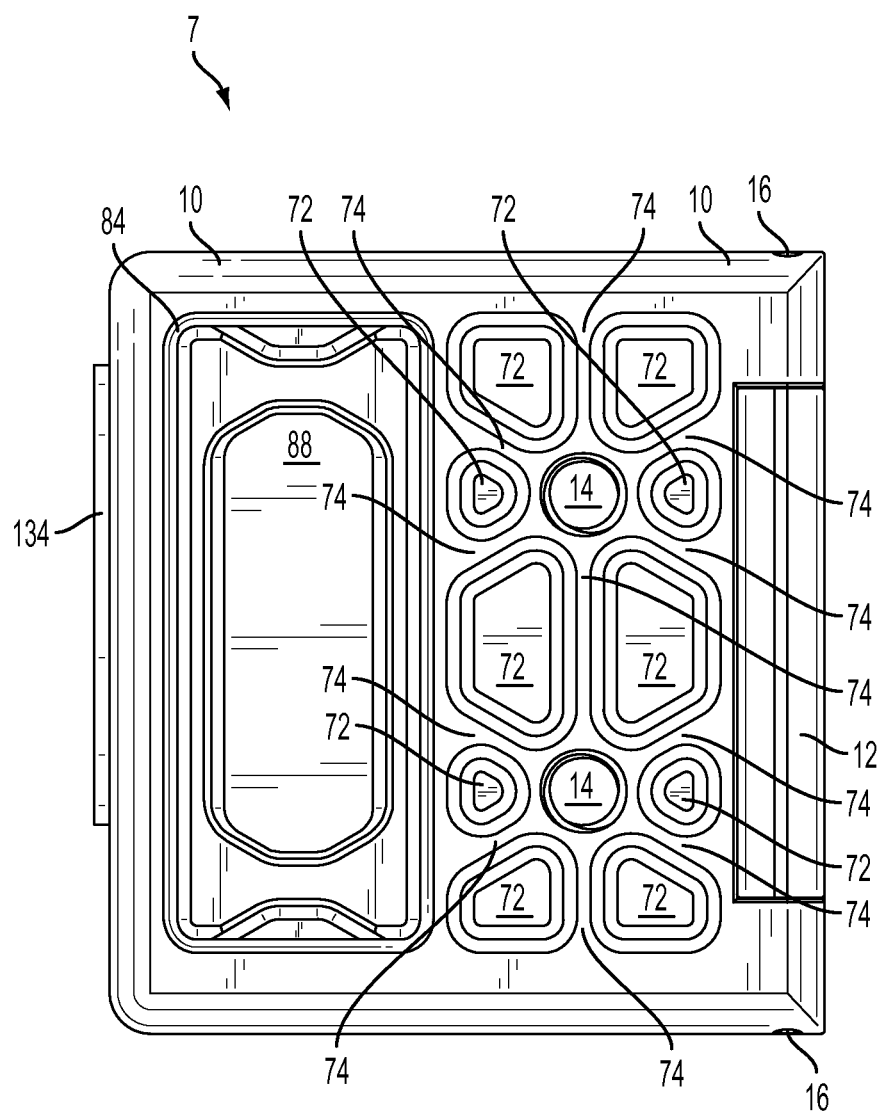
FIG. 4 is a left side elevation view the case of FIG. 1.
Figure 5:
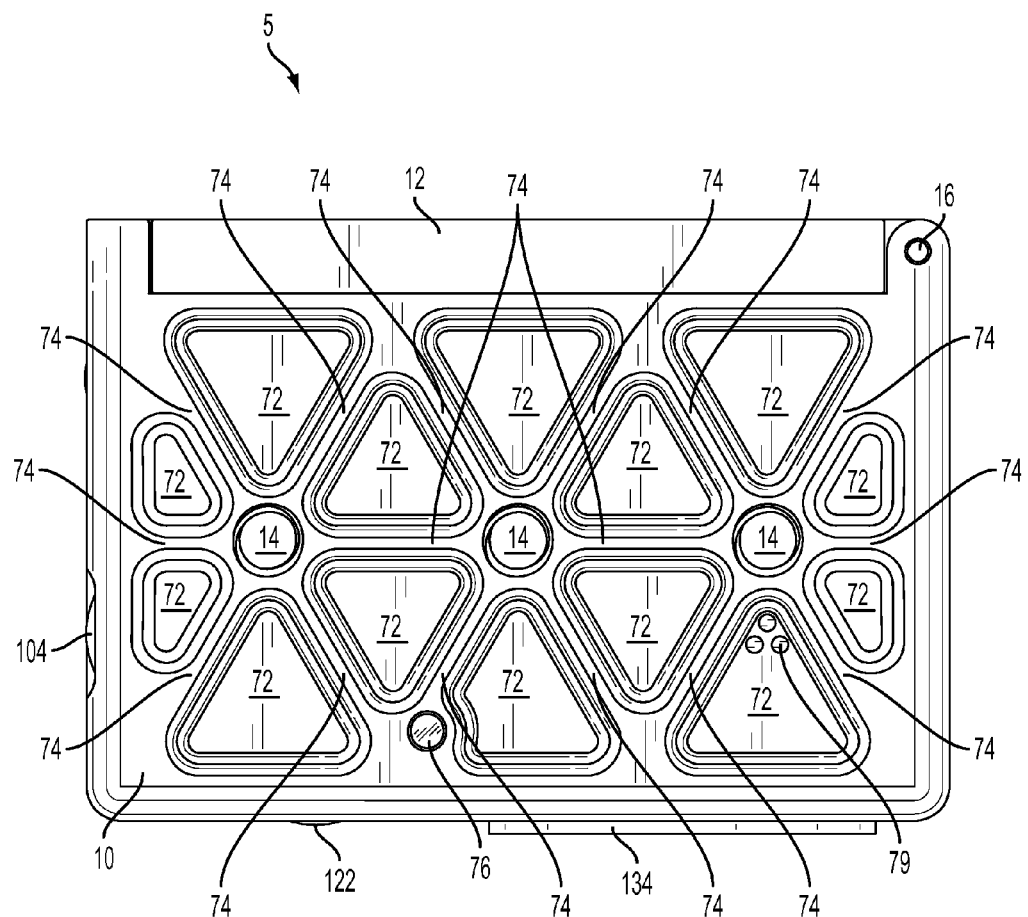
FIG. 5 is a top plan view of the case of FIG. 1.
Figure 6:
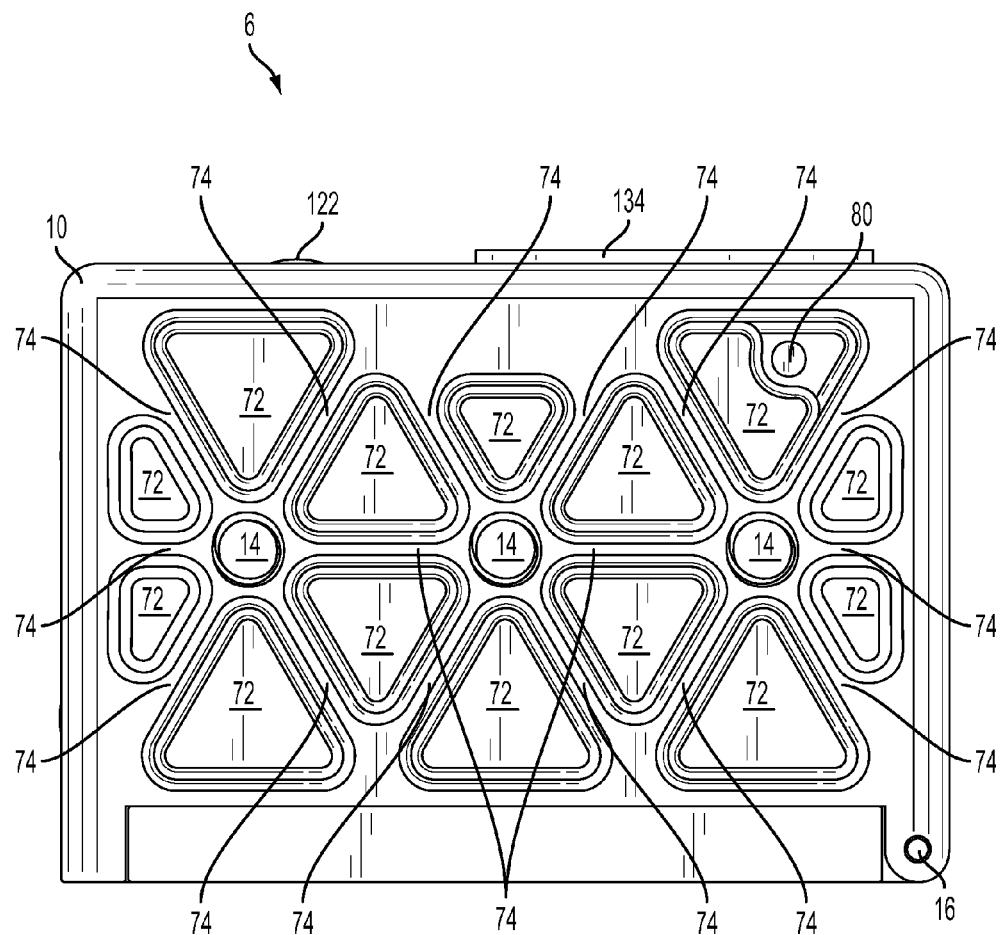
FIG. 6 is a bottom plan view of the case of FIG. 1.

As shown in FIG. 4, the left side 7 of the case can comprise a camera access port 84 and recesses 72. The camera access port 84 can be an opening through the left side 7 of the case that allows access to one or more features on the left side of the camera, such as USB ports and/or other inputs or outputs 86 shown in FIG. 11A. The camera access port 84 can be a generally rectangular opening that is adjacent the front side 3 of the case and extends from the top side 5 to the bottom side 6. The camera access port 84 can be filled with a plug 88 when access to the left side of the camera is not needed. The plug 88 can prevent moisture and dirt from entering the case through the camera access port 84. The left side 7 of the case can comprise two threaded openings 14 that can be aligned top-to-bottom and can be generally centered between the camera access port 84 and the rear side 4 of the case. A plurality of ribs 74 can connect the threaded openings 14 to the top, bottom, and rear sides of the case, as well as to the rear edge of the camera access port 84. The left side 7 of the case can also comprise a plurality of recesses 72 adjacent the ribs 74. The recesses 72 can be various shapes, such as trapezoidal and triangular, and can comprise a floor such that they do not connect to the internal opening in the case. The distance between the two threaded openings 14 on the left side 7 of the case can be about the same as the distances between the threaded openings 14 on the top and bottom sides of the case.

The right side 8 of the case (see FIG. 3) can comprise a second camera access port 90. The camera access port 90 can be an opening through the right side 8 of the case that allows access to one or more features on the right side of the camera (not shown), such as an SD card slot and an HDMI port. The camera access port 90 can be a generally rectangular opening that is adjacent the front side 3 of the case 1 and extends from the bottom side 6 to a location short of the top side 5. The camera access port 90 can be filled with a plug 92 when access to the right side of the camera is not needed. The plug 92 can prevent moisture and dirt from entering the case 1 through the camera access port 90. The right side 8 of the case can further comprise a threaded opening 14 that is at about the same position top-to-bottom and front-to-back as the lower threaded opening 14 on the left side 7 of the case. A plurality of ribs 74 can extend from the threaded opening 14 to provide added strength. The right side 8 of the case can also comprise a plurality of recesses 72. The recesses 72 can be various shapes, such as trapezoidal, rectangular, and triangular, and can have a floor such that they do not connect to the internal opening in the case.

The right side 8 of the case can also include a monitor button 94. The monitor button 94 can engage with a corresponding button (not shown) on the right side of a camera having a video monitor, such as the video monitor 62, attached to the rear of the camera and secured within the case 1. The monitor button 94 can comprise a flexible cover, such as made of rubber, that is sealed to prevent moisture or dirt from entering into the internal opening within the case 1. The monitor button 94 can be positioned in a recessed portion 96 of the right side 8 of the case to reduce the chance of accidentally pressing the monitor button. The recessed portion 96 can extend rearwardly to the rear side 4 of the case and can align with cutouts 98 in the rear door 12 and latch handle 26. One or more of the recesses 72 on the right side 8 can comprise one or more small holes 93 passing into the internal opening of the case to allow sound from the camera to pass through the case. These holes 93 can be covered by a thin membrane, such as adhesive tape, or other sound transmitting material, to prevent dirt and moisture from entering the case while still allowing sound to pass through the case.

Figure 14B:
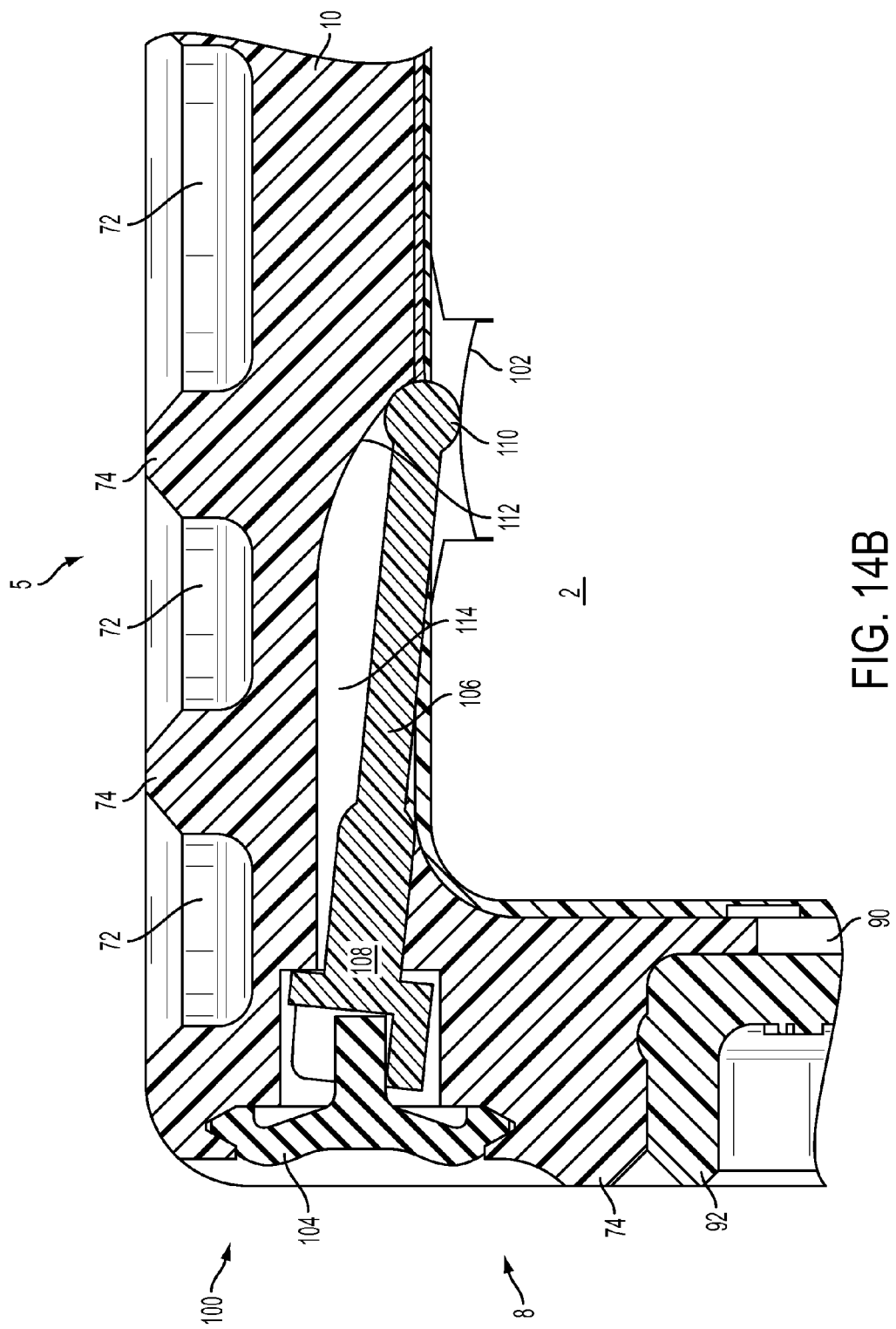

The right side 8 of the case can also include an activation mechanism or trigger 100. The trigger 100 can be positioned above the right camera access port 90 adjacent the top and front sides of the case. The trigger 100 can be configured to activate a camera button 102 positioned on the top side of a camera 2 within the case 1, such as to take a photo or start or stop a video recording. As shown in FIG. 14A, the trigger 100 can comprise a button flexible head 104 and a generally horizontal rod 106 having a first end 108 and a second bulbous end 110. The first end 108 of the rod is coupled to the button head 104 and the second end 110 of the rod can be positioned adjacent the camera button 102, such that pressing the button head 104 causes the second end 110 of the rod to slide along an inclined surface 112 of the case 1 that deflects the second end of the rod downward toward the camera button, as shown in FIG. 14B. The inclined surface 112 can be flat or curved to redirect the motion of the second end 110 of the rod downward. Thus, depressing the button head 104 on the right side 8 of the case in a horizontal direction can cause a vertical force that presses the camera button 102 downwardly to activate the camera 2. By converting a horizontal motion/force into a vertical motion/force, the trigger 100 can enable the case 1 to not have any buttons or other camera interaction features on the top side 5 of the case. This can be useful in situations where the case 1 is mounted to another object via one or more of the mounting features 14 in the top side 5 of the case and the top side of the case is not readily accessible for a user. The rod 106 can pass through a passageway 114 in the top side 5 of the case that is below the floors of the recesses 72 in the top side of the case. The button head 104 can be positioned in a recess in the right side 8 of the case to reduce the chance of accidentally activating the trigger 100. In other embodiments, the trigger 100 can be located on the opposite side of the case, with the button head on the left side of the case.

The recesses, ports, threaded openings and other cut-out portions in each of the top, bottom, left, and/or right sides of the case can collectively encompass a significant portion of the surface area of the respective side. In some embodiment, the recesses, ports, threaded openings and other cut-out portions in each of the top, bottom, left and/or right sides of the case collectively encompass at least 50% of the surface area of the respective side, and in other embodiments, at least 75% of the surface area.

The front side 3 of the case (see FIG. 2) is configured to coordinate with interactive features on the front of the camera 2 within the case. The front side 3 can comprise a window 118 at the upper left that is aligned with a display screen 120 on the front of the camera 2. The window 118 can be generally rectangular to match the shape of the display screen 120. The window 118 can comprise a transparent pane, such as made of a polycarbonate, acrylic, or other transparent yet strong material. The front side 3 of the case can also comprise a flexible button 122 below the window. The button 122 can be engaged with a power/mode button 124 on the front of the camera 2 such that pressing the flexible button 122 activates the power/mode button 124 behind it. The flexible button 122 can be sealed with the surrounding portion of the case 1 to prevent moisture or dirt from entering the internal opening in the case. The front side 3 of the case can also comprise a circular window 126 adjacent the flexible button 122 that is configured to align with a light 128 on the front side of the camera 2 such that the light 128 can be viewed through the window 126. The front side 3 of the case can also comprise a circular lens opening 130 that is configured to align with a lens 132 of the camera inside the case such that the camera 2 can receive light to the lens 132 without being blocked by the case. The front side 3 of the case can have an annular raised surface 134 around the lens opening 130 that is configured to receive various lens covers that can be mounted to the front side of the case to cover and protect the lens 132 of the camera. The raised surface 134 can comprise one or more attachment mechanisms, such as screw holes 136, threads, etc., configured to facilitate securing a lens cover to the front side 3 of the case. The front side 3 of the case can also comprise one or more recesses 138 positioned around the other features on the front side, which can reduce the weight of the case 1.

Figure 15A:
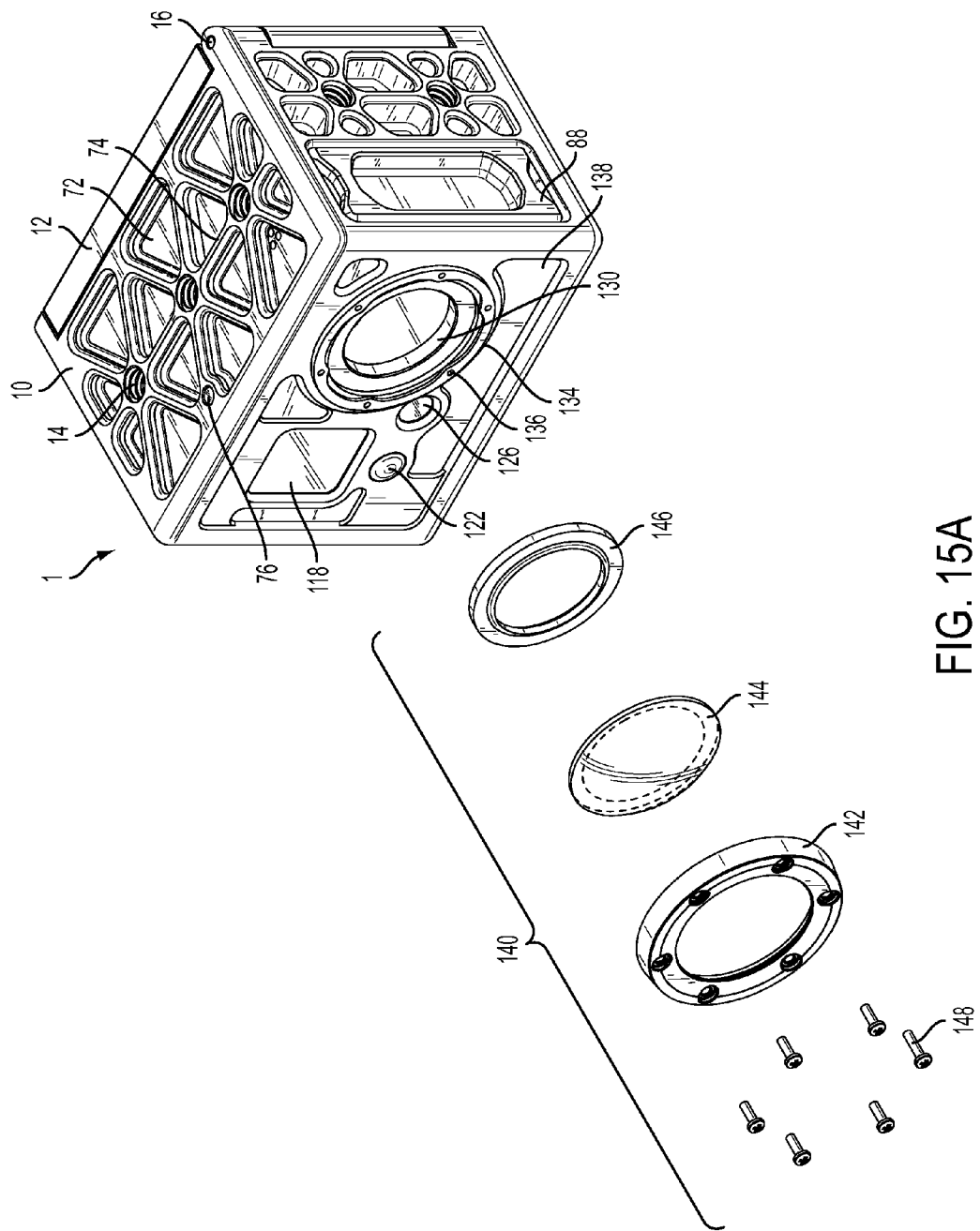
FIG. 15A is an exploded perspective view of a first lens cover for the case of FIG. 1.
Figure 15B:
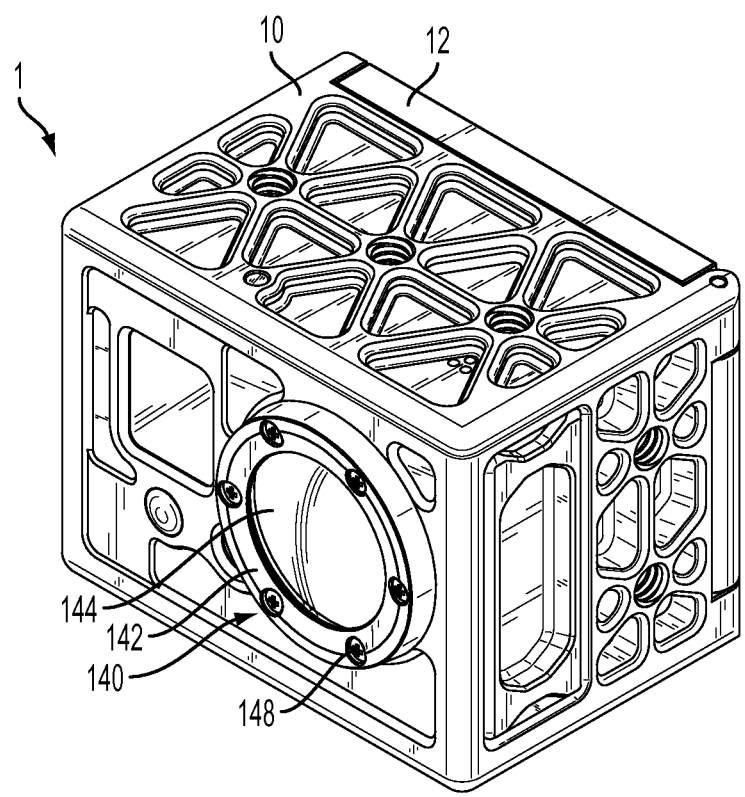
FIG. 15B is an assembled perspective view of the first lens cover of FIG. 15A.

A plurality of different lens covers can be alternatively coupled to the front face 3 of the case to cover the lens 132 of the camera. As shown in FIGS. 15A and 15B, a first lens cover 140 can comprise a ring 142, a dome 144, and a gasket 146. The dome 144 can comprise a curved, transparent window and can be seated within the ring 142. The ring 142 can comprise rigid material, such as plastic or metal, and can comprise one or more attachment mechanisms that correspond to those on the raised annular portion of the front side 3 of the case. The attachment mechanisms can comprise several holes in the ring that align with threaded openings 136 in the front side 3 of the case such that the ring can be secured using screws 148, such as machine screws. The ring 142 can physically trap the dome 144 and gasket 146 behind it to secure the first lens cover 140 in place over the lens opening 130 of the case. When secured to the case 1, the ring 142 can protrude forward of the front side 3 of the case, and the curved dome 144 can protrude farther forward through the center of the ring.

Figure 16B:
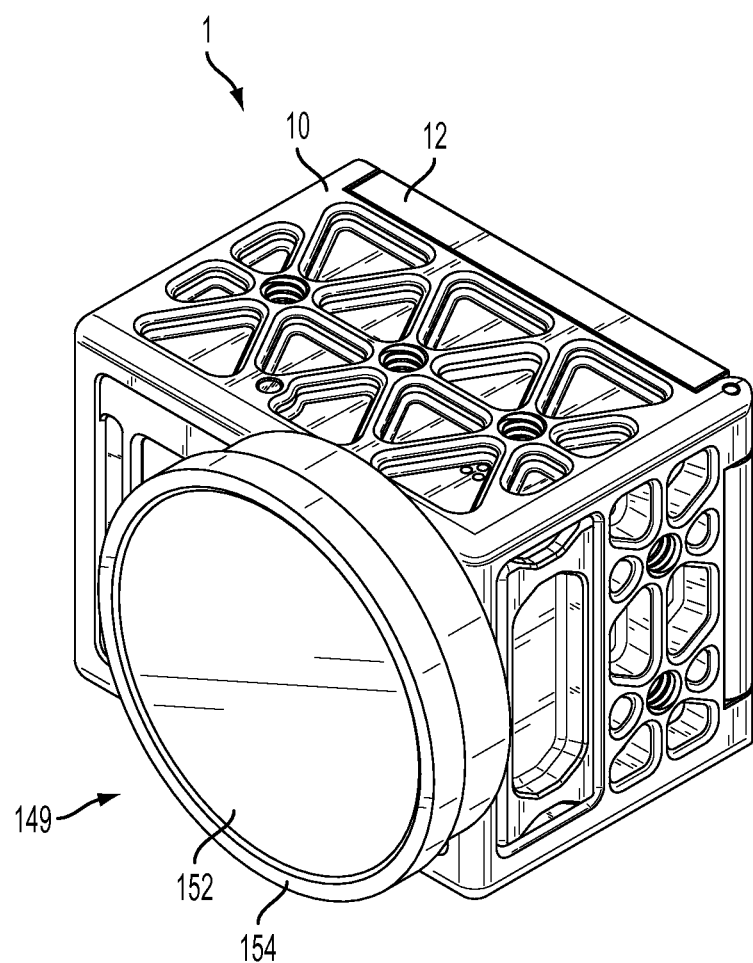
FIG. 16B is an assembled perspective view of the second lens cover of FIG. 16A.

As shown in FIGS. 16A and 16B, a second lens cover 149 can comprise a larger circular assembly. The assembly can comprise a base 150, a window 152, a ring 154, and plural gaskets. The base 150 can be secured to the front side 3 of the case using an attachment mechanism similar to the first lens cover, such as screws 148. The base 150 can be sealed against the front side 3 of the case with a first gasket 156 that sits within the raised annular portion 134 around the lens openings, and/or a second gasket 158 that sits outside of the raised annular portion. The base 150 comprises a central opening 160 that does not obstruct the view of the lens 132 of the camera. The base 150 can comprise a threaded outer circumference 162 such that the ring 154 can be threaded onto the base and trap the circular window 152 and a third gasket 164 between the ring and the base. A cover 166 can be placed over the ring and base to protect the window when not in use. The window 152 can be tinted or have other properties that affect the image received by the camera.

Figure 17A:
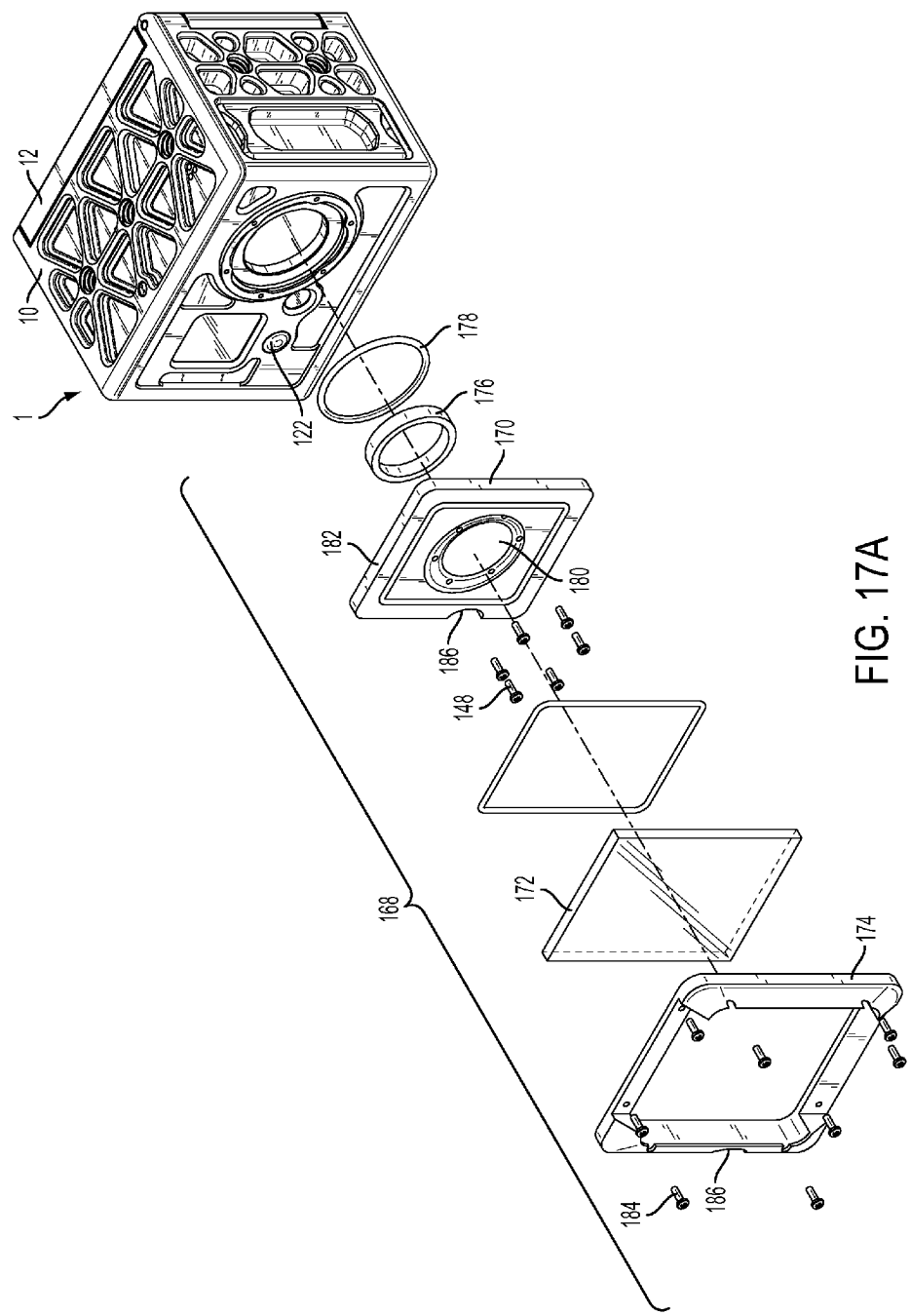
FIG. 17A is an exploded perspective view of a third lens cover for the case of FIG. 1.
Figure 17B:
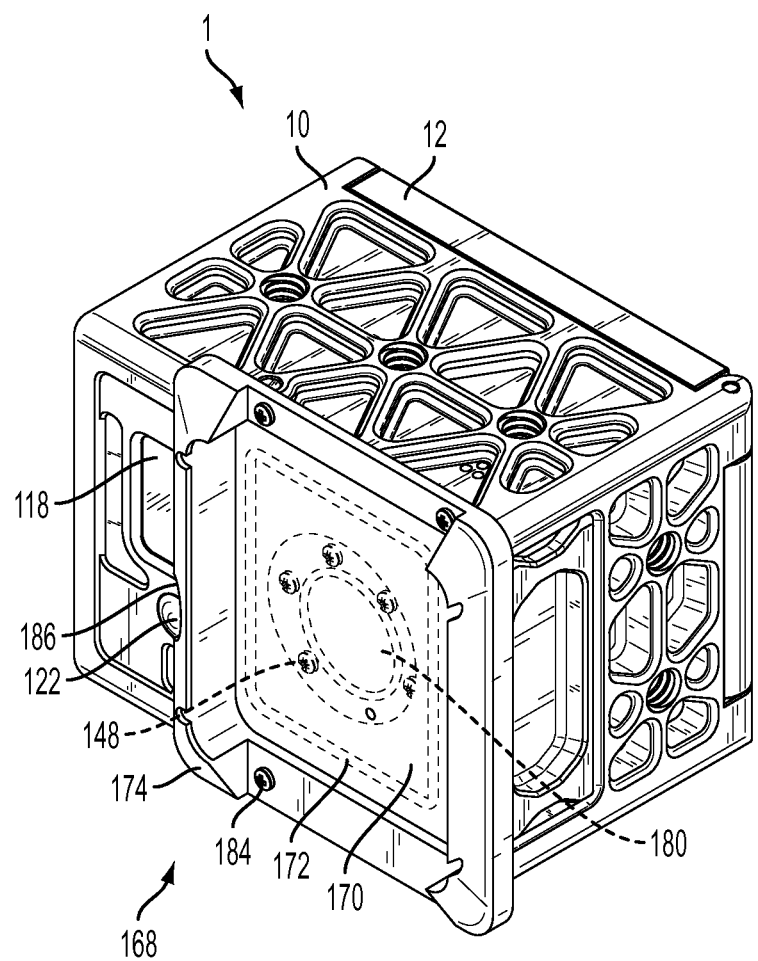
FIG. 17B is an assembled perspective view of the third lens cover of FIG. 17A.

As shown in FIGS. 17A and 17B, a third lens cover 168 can comprise a rectangular assembly similar to the second lens cover 149. The assembly of the third lens cover 168 can comprise a rectangular base 170, a rectangular window 172, a rectangular ring 174, and plural gaskets. The base 170 can be secured to the front side 3 of the case using an attachment mechanism similar to the first lens cover, such as screws 148. The base 170 can be sealed against the front side 3 of the case with a first gasket 176 that sits within the raised annular portion 134 around the lens opening, and/or a second gasket 178 that sits outside of the raised annular portion. The base 180 can comprise a circular central opening 180 the does not obstruct the view of the lens 132 of the camera. The base 170 comprises a rectangular outer perimeter adapted to receive the ring 174 against the base and trap the flat, rectangular window 172 and a third gasket between the ring and the base. The ring 174 can be secured to the base 170 via screws 184 or other attachment mechanisms. The ring 174 and base 170 can each comprise a small cutout 186 such that the power/mode button 122 can be accessed on the front side of the case with the third lens cover 168 secured. The window 172 can be tinted or have other properties that affect the image received by the camera. A cover (not shown) can be placed over the ring 174 and base 170 to protect the window 172 when not in use. The second and third lens covers 149, 168 can be waterproof and can reduce underwater blurring effects.

The body 10 of the case 1 and the lens cover rings and bases can comprise a strong, lightweight material, such as aluminum, such as aircraft grade aluminum. The body 10 of the case can be formed, or cut, from a single piece of material making it stronger and minimizing seams and assembly costs compared to multi-piece construction. The latch 20, pin 36, rod 106, hinges 16, screws 70, 148, 184, and/or other hardware can comprise stainless steel and/or other strong materials. The hood 48 of the adjustable portion 42 of the rear door 12 can comprise a lightweight, opaque material, such as rubber or other polymeric material. The central window 50 within the hood and the windows 118, 126 on the front side 3 of the case can comprise a transparent material such as a polycarbonate or acrylic material. The buttons 94, 104, 122 and plugs 88, 92 can comprise a flexible polymeric material, such as rubber. The magnets 40 can comprise rare earth magnets, such neodymium magnets.

The case 1, with the rear door 12 closed, the plugs 88, 92 inserted in the ports 84, 90, and a lens cover secured over the lens opening 130, can completely, or nearly completely, enclose a camera within the case and can be dirt and moisture resistant.

With a camera inserted into the body 10 and rear door 12 closed, the latch 20 in the secured position, and optionally with the fastener 70 in the locked position (as shown in FIG. 1), the case can very securely contain the camera, even during rigorous use, while allowing full functionality of all or most of the features of the camera. The strong yet lightweight case and the plural mounting features allow the case to be mounted to just about any object in any orientation. The case is especially well suited for use with a sports or action camera subject to rough handling conditions and taxing environments, e.g., mountain biking, hang gliding, skate boarding, surfing, snowboarding, automobile racing, etc. With plural mounting features on several sides, the case provides great flexibility with regard to different types of camera mounts, mounting a camera/case in different orientations, and mounting the camera/case to diverse mounting platforms (cars, bikes, boards, helmets, etc.). Furthermore, the case is highly durable when subject to substantial shocks, impacts, acceleration, as well as being resistant to moisture and dirt.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The apparatuses, systems, and methods are not limited to any specific aspect or feature or combination thereof, nor do the disclosed embodiments require that any one or more specific advantages be present or problems be solved.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims. We therefore claim all that comes within the scope of these claims.

We claim:

1. A camera case comprising a body configured to be positioned at least partially around a camera such that the camera is retained within the body, the body having a front side, a top side, a bottom side, a left side, and a right side, wherein at least two of the top, bottom, left, and right sides comprise at least one mounting feature configured to secure the case to a camera mount or mounting accessory;

wherein each of the top, bottom, left, and right sides comprise at least one mounting feature configured to secure the body to a camera mount or mounting accessory.

2. A camera case comprising a body configured to be positioned at least partially around a camera such that the camera is retained within the body, the body having a front side, a top side, a bottom side, a left side, and a right side, wherein at least two of the top, bottom, left, and right sides comprise at least one mounting feature configured to secure the case to a camera mount or mounting accessory;

wherein at least two of the top, bottom, left, and right sides comprise plural mounting features each configured to independently secure the case to a camera mount or mounting accessory.

3. The case of claim 2, wherein the case comprises a rear door coupled to the body and configured to allow a camera to be inserted into and removed from the case, the rear door comprising an adjustable portion that is couplable to the rear door in at least two different positions, wherein a frontmost surface of the adjustable portion is a different distance from the front side of the body in each of the different positions, such that the case is adjustable to be used with cameras having different depths.

4. A camera case comprising a body configured to be positioned at least partially around a camera such that the camera is retained within the body, the body having a front side, a top side, a bottom side, a left side, and a right side, wherein at least two of the top, bottom, left, and right sides comprise at least one mounting feature configured to secure the case to a camera mount or mounting accessory;
wherein the case comprises a rear door configured to allow a camera to be inserted into and removed from the case, the rear door comprising a latch configured to secure the rear door in a closed position against the body, the latch being pivotable relative to the rear door about a pivot axis, the latch comprising an engagement portion having a central axis that is parallel with and offset from the pivot axis, and wherein the engagement portion is engagable with a pin protruding from a rear side of the body, and wherein rotation of the latch about the pivot axis with the pin positioned in the engagement portion of the latch causes a cam effect that tightens the rear door against the rear side of the body.

5. A camera case comprising a body configured to be positioned at least partially around a camera such that the camera is retained within the body, the body having a front side, a top side, a bottom side, a left side, and a right side, wherein at least two of the top, bottom, left, and right sides comprise at least one mounting feature configured to secure the case to a camera mount or mounting accessory;
wherein the case comprises a rear door configured to allow a camera to be inserted into and removed from the case, the rear door comprising a pivotable latch for securing the door in a closed position against the body, further comprising at least a first magnet coupled to the latch and at least a second magnet coupled to the rear door, such that the first and second magnets engage each other when the latch is in a locked position against the rear door.

6. A camera case comprising a body configured to be positioned at least partially around a camera such that the camera is retained within the body, the body having a front side, a top side, a bottom side, a left side, and a right side, wherein at least two of the top, bottom, left, and right sides comprise at least one mounting feature configured to secure the case to a camera mount or mounting accessory;
wherein the case comprises a rear door configured to allow a camera to be inserted into and removed from the case, the rear door comprises a first opening, the rear side of the body comprises a rearwardly projecting foot having second opening that aligns with the first opening when the rear door is in a closed position, and the case further comprises a fastener that is positionable in a passive position wherein the fastener is inserted into the first opening only and positionable in a locked position wherein the fastener extends through the second opening and into the first opening, such that the door is locked in the closed position.

7. A camera case comprising a body configured to be positioned at least partially around a camera such that the camera is retained within the body, the body having a front side, a top side, a bottom side, a left side, and a right side, wherein at least two of the top, bottom, left, and right sides comprise at least one mounting feature configured to secure the case to a camera mount or mounting accessory;
further comprising a trigger having a button head on the right side or left side of the case, the trigger being configured to activate a camera button positioned on a top side of a camera within the case when the button head is pressed.

8. The case of claim 7, wherein the trigger further comprises a generally horizontal rod having a first end and a second end, the first end being coupled to the button head and the second end being positioned above the camera button, wherein depressing the button head causes the second end of the rod to slide along an inclined surface of the body that deflects the second end of the rod downward against the camera button to activate the camera.

9. A camera case comprising:
a body configured to be positioned at least partially around a camera such that the camera is retained within the body, the body having a front side and a rear side; and
a rear door coupled to the rear side of the body and configured to allow a camera to be inserted into and removed from the body; and
an adjustable portion couplable to the rear door in at least two different positions, such that the case has a different internal depth in each of the different positions.

10. The case of claim 9, wherein a frontward facing surface of the adjustable portion is a different distance from the front side of the body in each of the different positions.

11. The case of claim 9, wherein the adjustable portion is rotated about 180° between two of the at least two different positions.

12. The case of claim 9, wherein the adjustable portion comprises a window for viewing the rear of a camera within the case.

13. The case of claim 9, wherein the at least two different positions comprises a first position that corresponds to the depth of a camera in a basic configuration, a second position that corresponds to the depth of the camera with a first accessory attached to a rear of the camera, and a third position that corresponds to the depth of the camera with a second accessory attached to the rear of the camera.

14. The case of claim 9, wherein the body includes top, bottom, right and left sides, at least two of which sides include plural threaded openings for mounting one or more camera accessories, and each of which sides includes one or more cut out portions.

15. The case of claim 9, wherein the body includes top, bottom, right and left sides, each of which includes cut out portions collectively encompassing at least fifty percent of the surface area of the respective side.

16. A camera case comprising:
a body configured to be positioned at least partially around a camera such that the camera is retained within the body, the body having a front side, a rear side, a top side, a bottom side, a left side, and a right side; and
a trigger button on the right side or left side of the case, the trigger button being configured to activate a camera button positioned on a top side of a camera secured within the case:

wherein the trigger button comprises a button head and a rod comprising a first end and a second end, the first end being coupled to the button head and the second end being positioned adjacent the camera button, wherein depressing the button head horizontally causes the second end of the rod to slide along an inclined surface that deflects the second end downwardly into the camera button.

17. A camera case comprising:

a body configured to be positioned at least partially around a camera such that the camera is retained within the body, the body having a front side and a rear side; and a rear door coupled to the rear side of the body and configured to allow a camera to be insert into and removed from the case, the rear door comprising a latch for securing the rear door in a closed position against the rear side of the body, the latch being pivotable relative to the rear door about a pivot axis, the latch comprising a claw having a central axis that is parallel with and offset from the pivot axis, the claw being configured to engage a pin on the rear side of the body to secure the rear door in the closed position.

18. The case of claim 17, wherein rotation of the latch about the pivot axis with the pin positioned in the claw of the latch causes a cam effect that tightens the rear door to the rear side of the body.

* * * * *